(12) United States Patent
Koyanagi et al.

(10) Patent No.: US 8,407,261 B2
(45) Date of Patent: Mar. 26, 2013

(54) DEFINING A DATA STRUCTURE FOR PATTERN MATCHING

(75) Inventors: Teruo Koyanagi, Kanagawa-ken (JP); Yuta Tsuboi, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 12/494,559

(22) Filed: Jun. 30, 2009

(65) Prior Publication Data
US 2010/0017397 A1 Jan. 21, 2010

(30) Foreign Application Priority Data
Jul. 17, 2008 (JP) .................................. 2008-185780

(51) Int. Cl.
*G06F 17/30* (2006.01)
(52) U.S. Cl. ................. 707/797; 707/780; 707/E17.039
(58) Field of Classification Search .................. 707/797, 707/780, E17.039, 999.006
See application file for complete search history.

(56) References Cited

U.S. PATENT DOCUMENTS

| | | | |
|---|---|---|---|
| 5,452,451 A | 9/1995 | Akizawa et al. | |
| 6,292,938 B1 | 9/2001 | Sarkar et al. | |
| 6,662,184 B1 | 12/2003 | Friedberg | |
| 6,859,455 B1 | 2/2005 | Yazdani et al. | |
| 7,139,688 B2 * | 11/2006 | Aggarwal et al. | 703/2 |
| 7,257,576 B2 * | 8/2007 | Eminovici | 1/1 |
| 7,389,296 B2 | 6/2008 | Chari et al. | |
| 7,565,380 B1 * | 7/2009 | Venkatachary | 1/1 |
| 7,636,717 B1 * | 12/2009 | Gupta et al. | 1/1 |
| 7,756,772 B1 * | 7/2010 | Konopnicki et al. | 705/37 |
| 7,801,923 B2 * | 9/2010 | LeTourneau | 707/797 |
| 7,917,486 B1 * | 3/2011 | Gupta et al. | 707/705 |
| 8,032,479 B2 | 10/2011 | Kori | |
| 2005/0132342 A1 * | 6/2005 | Van Lunteren | 717/143 |
| 2006/0106773 A1 * | 5/2006 | Chang et al. | 707/3 |
| 2006/0259498 A1 | 11/2006 | Ellison et al. | |
| 2007/0124146 A1 * | 5/2007 | Lunteren | 704/255 |
| 2007/0282835 A1 * | 12/2007 | Duxbury | 707/6 |
| 2008/0071802 A1 * | 3/2008 | Lucco et al. | 707/100 |
| 2008/0082946 A1 * | 4/2008 | Zilic et al. | 716/5 |

(Continued)

FOREIGN PATENT DOCUMENTS
JP 2005-242672 A 9/2005

OTHER PUBLICATIONS

Cai et al., "More Efficient Bottom-Up Multi-Pattern Matching in Trees", Journal of Theoretical Computer Science, vol. 106, Issue 1, Nov. 1992, pp. 21-60 (41 pages).*

(Continued)

*Primary Examiner* — Phuong Thao Cao
(74) *Attorney, Agent, or Firm* — Brian J. Teague

(57) ABSTRACT

An information processing apparatus according to the present invention comprises a generation section configured to generate an ordered tree structure by defining transition edges between nodes using, as transition conditions, respective constraints from one or more constraint pattern each including plural constraints, a search section configured to search for a second substructure K similar to a first substructure P from a root node by determining a set relation between transition conditions of respective transition edges, and a transition defining section configured to define an additional transition link from a tail node $s^K_n$ of the second substructure K to a child node $s^P_{n+1}$ of the first substructure P, the additional transition link adding a constraint to be met by an indeterminant identified from the set relation, wherein a data structure for pattern matching is defined.

15 Claims, 14 Drawing Sheets

U.S. PATENT DOCUMENTS

| | | | | |
|---|---|---|---|---|
| 2008/0133518 | A1* | 6/2008 | Kapoor et al. | 707/6 |
| 2008/0172645 | A1* | 7/2008 | Finkler et al. | 716/9 |
| 2008/0178293 | A1* | 7/2008 | Keen et al. | 726/23 |
| 2009/0063572 | A1* | 3/2009 | Li et al. | 707/200 |
| 2010/0076919 | A1* | 3/2010 | Chen et al. | 706/48 |
| 2010/0094906 | A1* | 4/2010 | Della-Libera et al. | 707/797 |
| 2010/0114811 | A1* | 5/2010 | Lambov | 706/48 |
| 2010/0153420 | A1* | 6/2010 | Yang et al. | 707/758 |

OTHER PUBLICATIONS

Ramesh et al., "Non Linear Pattern Matching in Trees", Journal of the Association for Computing Machinery, vol. 39, No. 2, Apr. 1992, pp. 295-316 (22 pages).*

Hoffman et al., "Pattern Matching in Trees", Journal of the Association for Computing Machinery, vol. 29, No. 1, Jan. 1982, pp. 68-95 (28 pages).*

Delia Kesner, "Pattern Matching in Order-Sorted Language", May 1991, 36 pages, accessed online at <http://citeseerx.ist.psu.edu/viewdoc/summary?doi=10.1.1.34.596> on Nov. 15, 2012.*

Efficient String Matching: An Aid to Bibliographic Search; Alfred V. Aho and Margaret J. Corasick; Bell Laboratories; Communications of the ACM, vol. 18, No. 6, Jun. 1975; pp. 333-340.

Backtracking-Free Dictionary Access Method for Japanese Morphological Analysis; Hiroshi Maruyama; IBM Research, Tokyo Research Laboratory; pp. 208-213.

High Speed Morphological Analysis using DFA; Shinsuke Mori, Department of Electrical Engineering, Kyoto University, Jul. 19, 1996; pp. 101-107.

An Efficient Digital Search Algorithm by Using a Double-Array Structure; Jun-Ichi Aoe, IEEE Transactions on Software Engineering, vol. 15. No. 9, Sep. 1989, pp. 1066-1077.

Takahiro Ota, Data Compression Using Source Model Based on Antidictionary Tree, Report of the Institute of Electronics, Information and Communication Engineers, vol. 105, No. 665, pp. 135-140 by The Institute of Electronics, Information and Communication Engineers.

Becchi, M., Memory-Efficient Regular Expression Search Using State Merging, Proceedings IEEE Infocom 2007, pp. 1064-1072, available at http://dx.doi.org/10.1109/INFOCOM.2007.128.

* cited by examiner

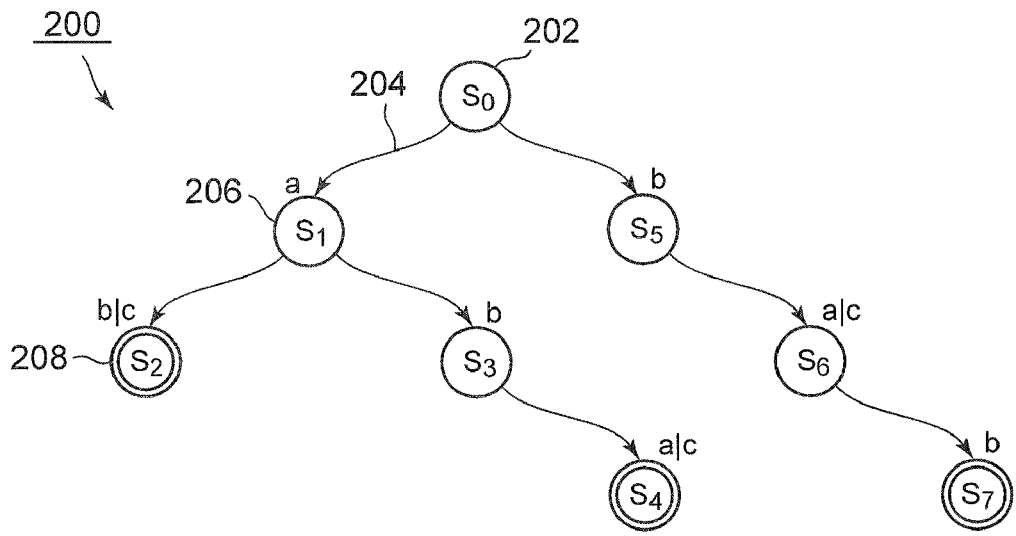
(A)
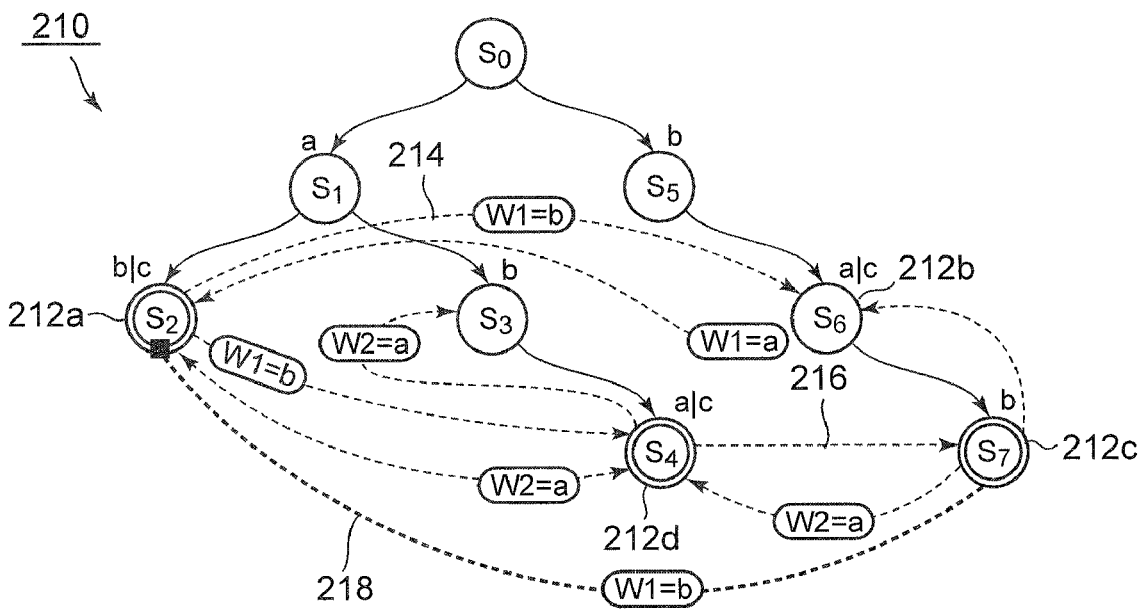
(B)
FIG. 2

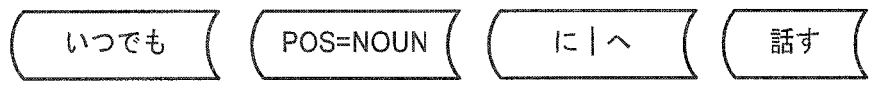
(A)
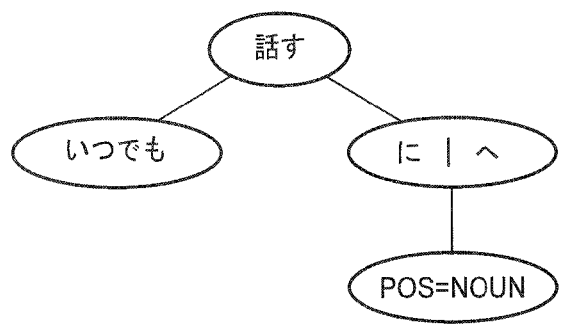
(B)
(C)
FIG. 3

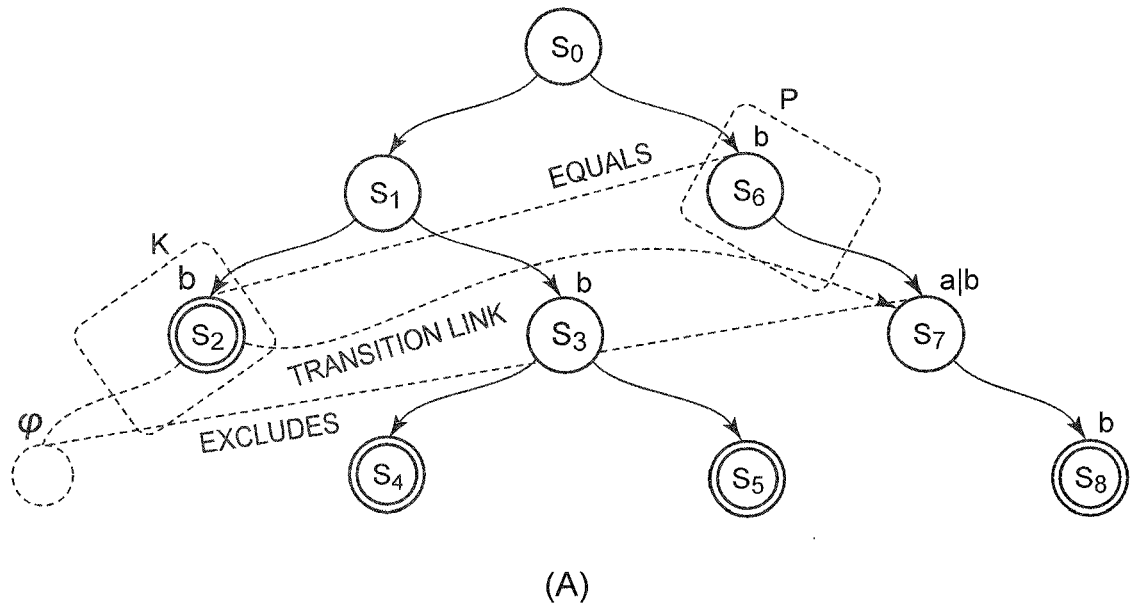
(A)
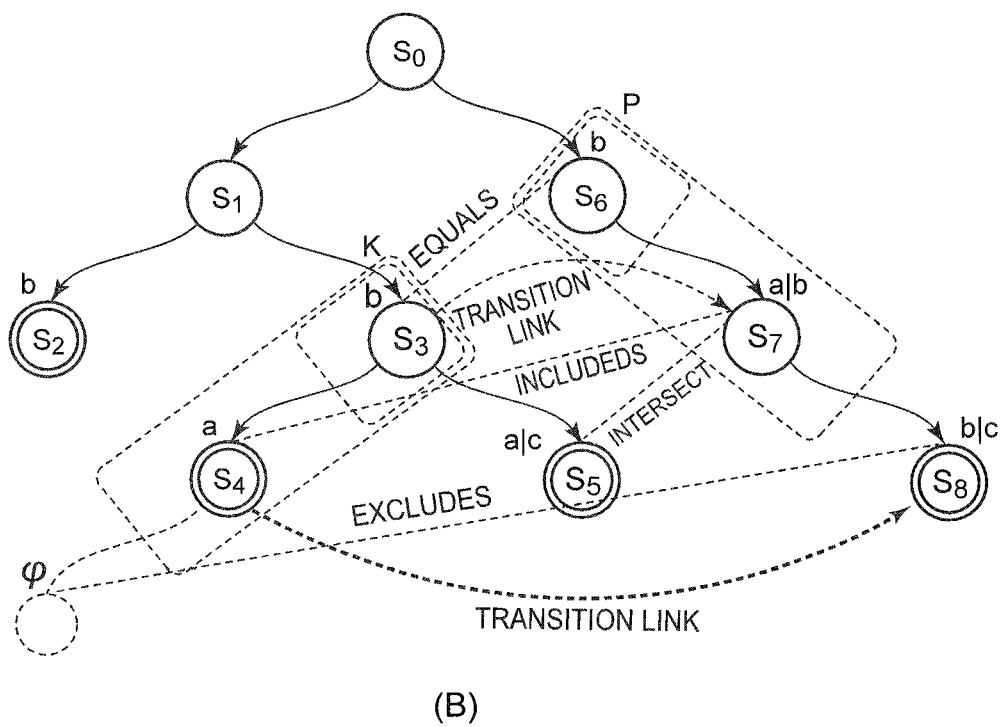
(B)
FIG. 4

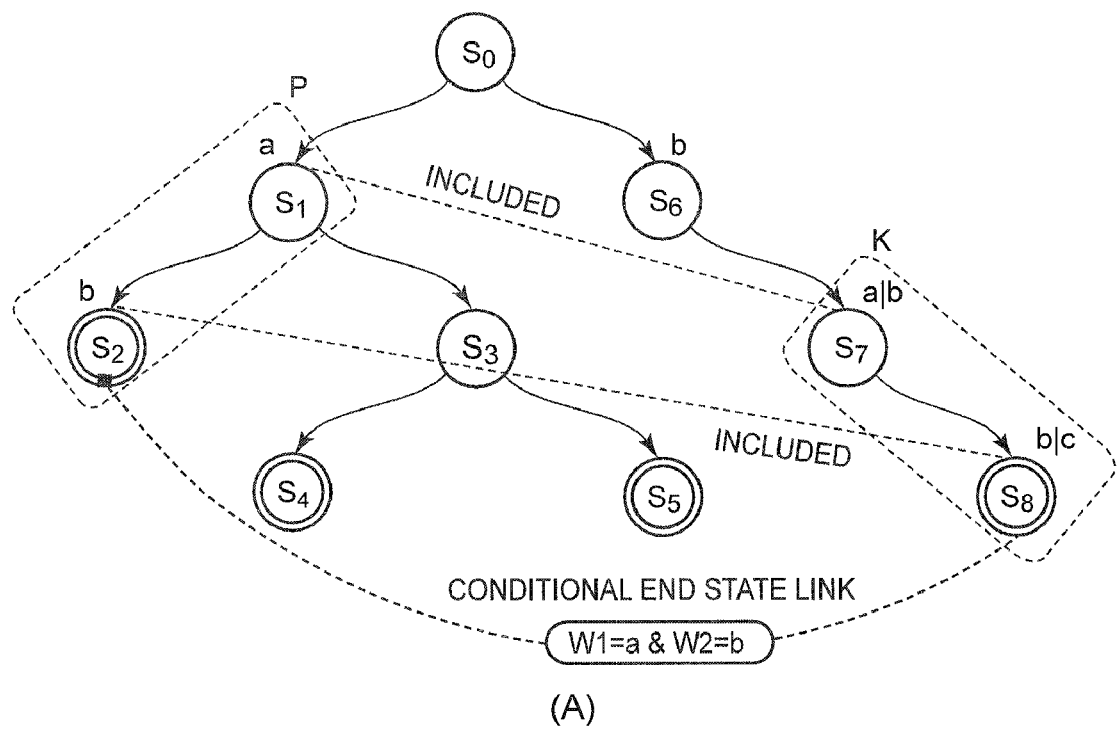
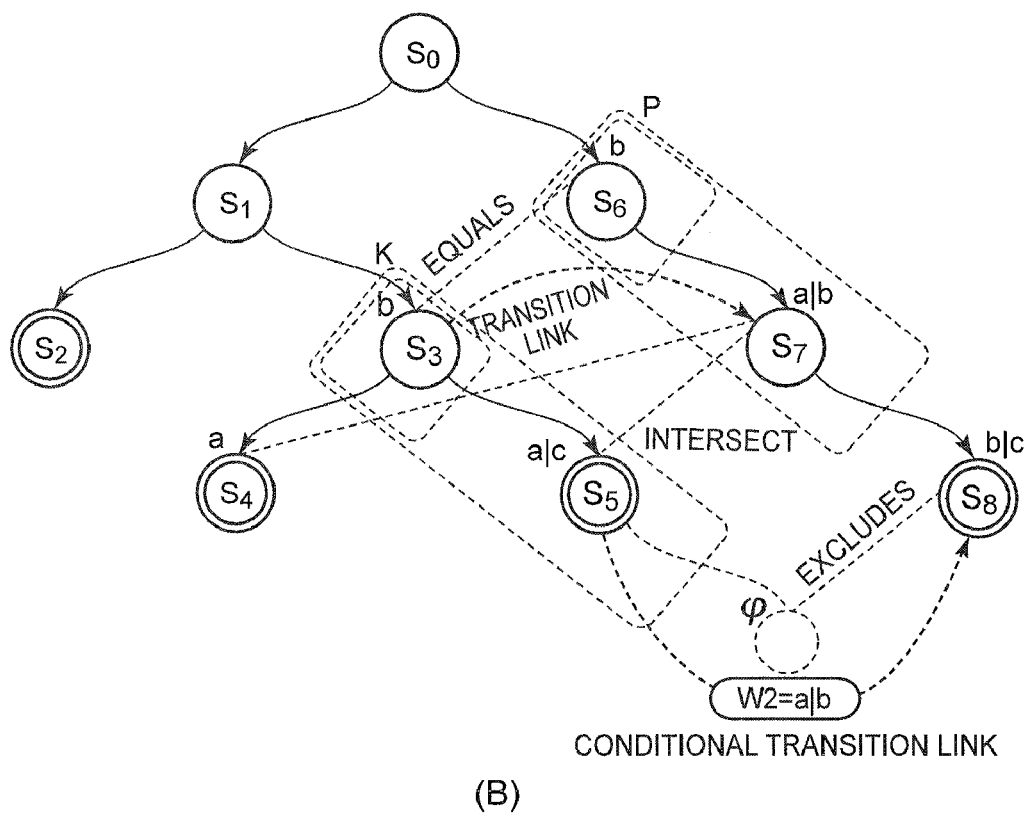
FIG. 5

```
void makeDFATransitions(State state, State initState) {
   List<Pattern> indeterminantList = new ArrayList<Pattern>();
   makeDFATransitions(state, initState, indeterminantList, false);
   Iterator<Transition> it = state.getTrieTransitionIterator();
   while (it.hasNext())
      makeDFATransitions(it.next().getState(), initState);
} void makeDFATransitions(State srcState, State destState,
         List<Pattern> indeterminants, boolean isMatchedBefore) {
   if (destState.isEndState()) {
      generateEndTransition(srcState, destState, ideterminants);
      return;
   }
   Iterator<Transition> destTrIt = destState.getTrieTrIterator();
   while (destTrIt.hasNext()) {
      Transition destTr = destTrIt.next();
      Iterator<Transition> srcIt = srcState.getTrieTrIterator();
      boolean isDFATransition = isMatchedBefore;
      while (srcIt.hasNext()) {
         Transition srcTr = srcIt.next();
         switch (destTr.getPattern().compareTo(srcTr.getPattern())) {
         case INCLUDED: isDFATransition = false;
         case INTERSECTS:
            addIndeterminant(destTr.getPattern(), indeterminants);
            makeDFATransitions(srcTr.getState(), destTr.getState(),
               indeterminants, true);
            removeLatestIndeterminant(indeterminants);
            break;
         case EQUALS: isDFATransition = false;
         case INCLUDES:
            makeDFATransitions(srcTr.getState(), destTr.getState(),
               indeterminants, true);
            break;
         case EXCLUDES: break;
         }
      }
      if (isDFATransition)
         genDFATransition(srcState, destTr, indeterminants);
   }
}
```

FIG. 8

```xml
<mi category="1" value="abc">
   <w id="2" str="a"/> <w id="3" str="b"/>
   <w id="4" str="c" lex="a"/>
</mi>
<mi category="2" value="acfa">
   <w id="2" str="a"/> <w id="6" str="c"/>
   <w id="7" str="f"/> <w id="8" str="a"/>
</mi>
<mi category="3" value="bcdb">
   <w id="9" str="b"/> <w id="10" str="c" lex="/./"/>
   <w id="11" str="d"/> <w id="12" str="b"/>
</mi>
<mi category="4" value="bcfc">
   <w id="9" str="b"/> <w id="10" str="c" lex="/./"/>
   <w id="15" str="f"/> <w id="16" str="c"/>
</mi>
<mi category="5" value="cf">
   <w id="17" str="c" lex="a"/> <w id="18" str="f" lex="b"/>
</mi>
<mi category="6" value="cac">
   <w id="17" str="c" lex="a"/> <w id="20" str="a"/>
   <w id="21" str="c"/>
</mi>
```

FIG. 9

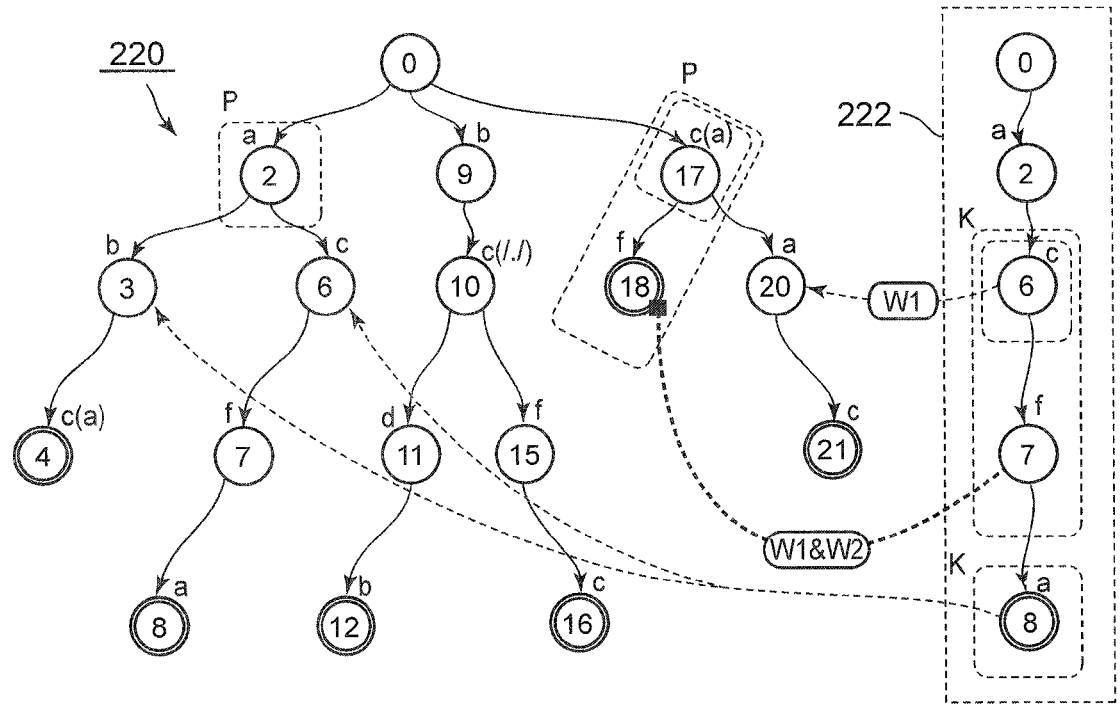
(A)
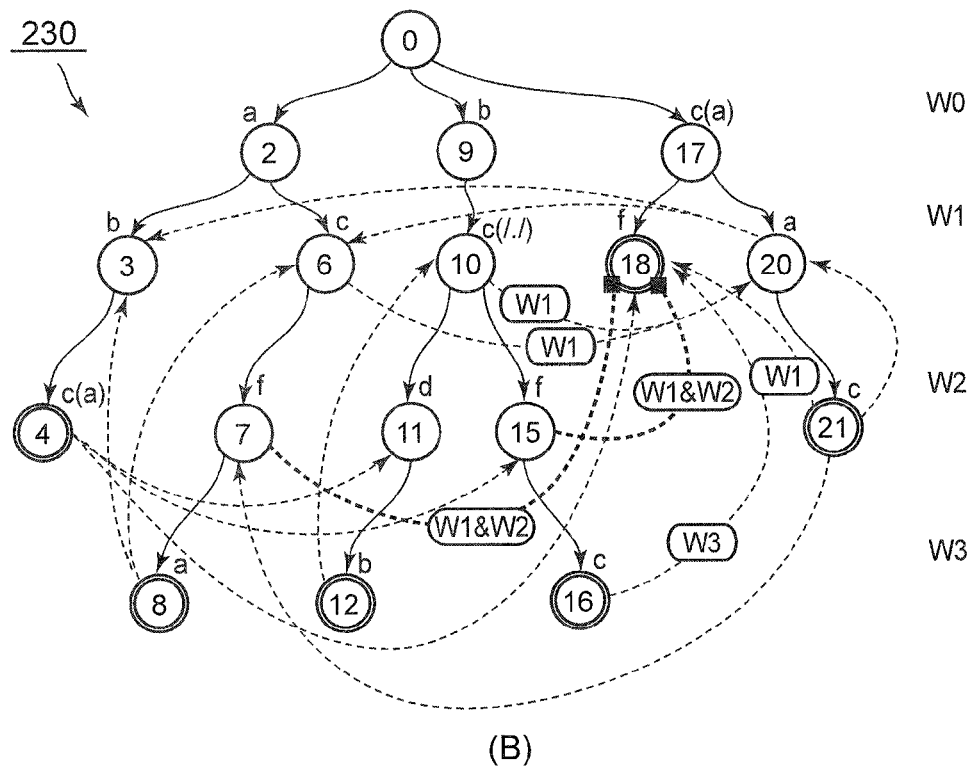
(B)
FIG. 10

DEFINING A DATA STRUCTURE FOR PATTERN MATCHING

CROSS-REFERENCE TO RELATED APPLICATIONS

This application claims priority to Japan Patent Application No. 2008-185780, filed Jul. 17, 2008, the contents of which are incorporated herein by reference in its entirety.

FIELD OF THE INVENTION

The present invention relates to natural language analysis technology, and more particularly, to an information processing apparatus, an information processing method, and a program, which realize pattern matching of text information with small memory and high computational efficiency.

BACKGROUND OF THE INVENTION

Recently, since high-speed, large-capacity communications infrastructures including computers and the Internet have been widespread, massive amounts of unformatted text information have been created and accumulated. Therefore, it is becoming increasingly important to make use of text information as unstructured information. Particularly, in order to handle text information, techniques for performing natural language analysis processing to extract and make use of various hierarchical levels of semantic information have been actively developed lately.

In conventional natural language analysis processing, an appropriate character string analysis method, such as morphological analysis, is first used to tag each word as a part of speech (i.e., to perform part-of-speech tagging). In this case, if the language does not have explicit word boundaries (no space between words), such as Japanese, Chinese, or Thai, the text is segmented into units of words before the part-of-speech tagging, whereas if the language has explicit word boundaries, such as French or German, the part-of-speech tagging is performed without word segmentation of the text. Then, semantic representations representing higher semantic levels are extracted from relationships among plural words.

To extract semantic representations from text information, editable patterns of lexicographic representations to be extracted are defined and provided because required information is generally different depending on the specific application. Specifically, the patterns to be defined are to define a local syntax for each word, or to be more specific, the occurrence and order of the word. Syntactic dependency can be used as semantic information extracted using such a word string pattern.

The following describes conventional processing of syntactic dependency extraction in Japanese with reference to FIG. 14. For example, a sentence "パソコンの 設定を変更した ら、インタネットに接続でき なくなった。" 500 shown in FIG. 14 is segmented by morphological analysis into words "パソコン (noun)", "の (postpositional particle)", "設定 (noun)", "を (postpositional particle)", "変更 (noun)", "し (する/verb)", "たら (auxiliary verb)", "、 (comma)", . . . , "でき (できる/verb)", "なく (auxiliary verb)", "なつ (verb)", "た (auxiliary verb)," and "。 (period)". Then, part-of-speech information and a regular expression, if any, are tagged for each word to obtain morphological analysis data 502.

When dependency parsing using a constraint array pattern 504 defined in the sequence of words "(noun)", "を| に (postpositional particle)", "(noun)", and "する| できる (verb)" is applied to the obtained morphological analysis data 502, syntactic dependencies that match the constraint array pattern 504, i.e., "設定を 変更する" and "インタネットに 接続できる" are extracted.

In the prior art, since plural array patterns are processed concurrently, the array pattern 504 is stored in an ordered tree structure called a trie or prefix tree (hereinafter referred to as "trie"), and pattern matching between the constraint array pattern 504 defining the semantic dependency and the sentence 500 is performed by an algorithm applied to the input sentence as a non-deterministic finite automaton (NFA).

In the pattern matching processing using the trie, the implementation must consider the amount of computation and memory usage sufficiently. It has been known to convert an NFA to an equivalent deterministic finite automaton (DFA) in order to implement the NFA in a sufficiently practical manner. However, since the conversion from NFA to DFA increases the memory usage, there is a trade-off relationship between computational efficiency and memory usage.

BRIEF SUMMARY OF THE INVENTION

However, in the algorithm using the above-mentioned conventional trie as NFA, since each word of the input text information needs to be matched to each state of the trie in a backtracking manner, the amount of computation, O (nm), is necessary for an average value n of the number of matched words and the number m of words of the input document, resulting in insufficiency from the standpoint of computational efficiency.

Further, a simple extension may not be made even if one tries to apply the method of converting NFA to DFA in the simple word matching processing to the matching processing for the constraint array pattern. For example, in the case of use of dictionary patterns with sequences of words, the extension can be made by storing words into the trie instead of characters. However, in the case that words are represented by regular expressions, simple processing of sequences of words is insufficient, and processing of sequences of word sets is necessary. Thus, a trie with sequences of word sets needs to be converted to DFA.

Embodiments of the present invention provide an information processing apparatus, an information processing method, and a program, capable of realizing matching between constraint patterns and text information with small memory and high computational efficiency even if the text information includes regular expressions.

An information processing apparatus according to the present invention generates an ordered tree structure in which transition edges between nodes are defined using, as transition conditions, respective constraints from one or more constraint patterns each including plural constraints, and defines an additional transition link between nodes for the basic structure of the generated ordered tree structure. The additional transition link is defined by determining a set relation between transition conditions of respective transition edges, searching a second substructure similar to a first substructure (i.e., prefix) from a root node, and adding a constraint, to be met by an indeterminant identified from the set relation, from a tail node of the second substructure to a child node at the tail end of the first substructure.

An automaton configured to perform pattern matching by referring to a data structure defined by the above-mentioned structure makes a transition between states through the additional transition link, and efficiently goes across the ordered tree structure representing the one or more constraint patterns, making it possible to identify a portion matched with each constraint pattern in target input information. Since the additional transition link additionally defines a constraint on an indeterminant to be met to deem that the constraint pattern matches the first substructure if it matches up to the tail end of the second substructure which is a transition source, efficient pattern matching can be realized for the constraint patterns including regular expressions. In addition, since the additional transition link is defined by determining a set relation between transition conditions of the transition edges, only a minimum number of transition links are defined, thereby making it possible to reduce memory usage.

Further, in embodiments of the present invention, if a second substructure similar to a first substructure the tail node of which is an end state is found, a reference link subject to an indeterminant constraint may be defined from the tail node of the second substructure to the tail node of the first substructure the tail end of which is the end state. The automaton configured to perform pattern matching by referring to a data structure in which the reference link is defined may generate an output corresponding to the end state of the link destination with only minimum re-evaluation of indeterminants when the automaton reaches a state as a source of the reference link while going across the ordered tree structure, thereby making it possible to provide a result output of the pattern matching with higher computational efficiency.

In embodiments of the present invention, a node string connected by a transition edge whose transition condition is in an EQUALS, INCLUDED, INCLUDES, or INTERSECTS relation may be identified as a similar substructure during searching. This makes it possible to determine likeness and indeterminacy of transition conditions from the set relation, enabling an efficient search for a self-similarity structure in the ordered tree structure.

Further, in embodiments of the present invention, if a transition condition from the tail node of the first substructure as a transition destination is not in both INCLUDED and EQUALS relations with a transition condition from the tail node of the second substructure as a transition source, the additional transition link may be defined. According to this structure, only possible transition links are added even if no transition from the tail node of the second substructure occurs, so that a minimum number of transition links are defined, thereby making it possible to reduce memory usage.

Further, in embodiments of the present invention, if a transition condition from a node of the first substructure as the transition destination is in the INCLUDED or INTERSECTS relation with the transition condition from the tail node of the second substructure as the transition source, the corresponding transition edge may be set as the indeterminant to record a constraint on the transition condition as the indeterminant constraint. According to this structure, even if a transition on the second substructure side occurs, since an additional condition only for the indeterminant is generated when the occurrence of a transition on the corresponding first substructure side is indeterminate, only essentially necessary conditions are re-evaluated during pattern matching, avoiding determination with unnecessary conditions.

In embodiments of the present invention, each of the constraints constructing the constraint pattern may include one or more constraint elements on a character string expression, regular expression, or part-of-speech information of a word. The data structure of the constraint pattern may be a data structure having a string structure of constraints, a tree structure of constraints, or a structure representing the tree structure as a string structure.

In embodiments of the present invention, an automaton may be generated to match input information to one or more constraint patterns represented by the defined data structure. Also, in embodiments of the present invention, the automaton may be a deterministic finite automaton. Further, in embodiments of the present invention, the automaton may be configured to perform pattern matching between the input information and the constraint pattern while referring to the data structure representing one or more constraint patterns stored in a storage device.

In one embodiment of the invention, an information processing apparatus for defining a data structure for pattern matching comprises a generation section, a search section, and a transition defining section. The generation section is configured to generate an ordered tree structure by defining transition edges between nodes using, as transition conditions, respective constraints from one or more constraint patterns each including plural constraints. The search section is configured to search for a second substructure similar to a first substructure from a root node by determining a set relation between transition conditions of respective transition edges. The transition defining section is configured to define an additional transition link from a tail node of the second substructure to a child node at a tail end of the first substructure, the additional transition link adding a constraint to be met by an indeterminant identified from the set relation.

The information processing apparatus may further comprise a reference defining section configured to define a reference link from the tail node of the second substructure to a tail node of the first substructure the tail end of which is an end state, the reference link being subject to the indeterminant constraint.

The search section may identify, as similar substructure, a node string connected by a transition edge whose transition condition is in an EQUALS, INCLUDED, INCLUDES, or INTERSECTS relation.

When a transition condition from a tail node of the first substructure is in neither INCLUDED nor EQUALS relation with a transition condition from the tail node of the second substructure, the transition defining section may define the additional transition link.

When a transition condition from a node of the first substructure is in an INCLUDED or INTERSECTS relation with a corresponding transition edge at the second substructure side, the search section may record the corresponding transition edge as the indeterminant and a constraint of the transition condition as the indeterminant constraint.

The information processing apparatus may further comprise an automaton configured to match input information with the one or more constraint patterns represented by the defined data structure.

Each of the constraints comprising a constraint pattern may include one or more constraint elements for a character string expression, regular expression, or part-of-speech information of a word.

The information processing apparatus may further comprise a storage device configured to store the defined data structure for pattern matching.

In addition to the information processing apparatus for defining a data structure for pattern matching, as described above, other aspects of the present invention are directed to corresponding methods and computer program products for defining a data structure for pattern matching.

BRIEF DESCRIPTION OF THE DRAWINGS

Figure 1:
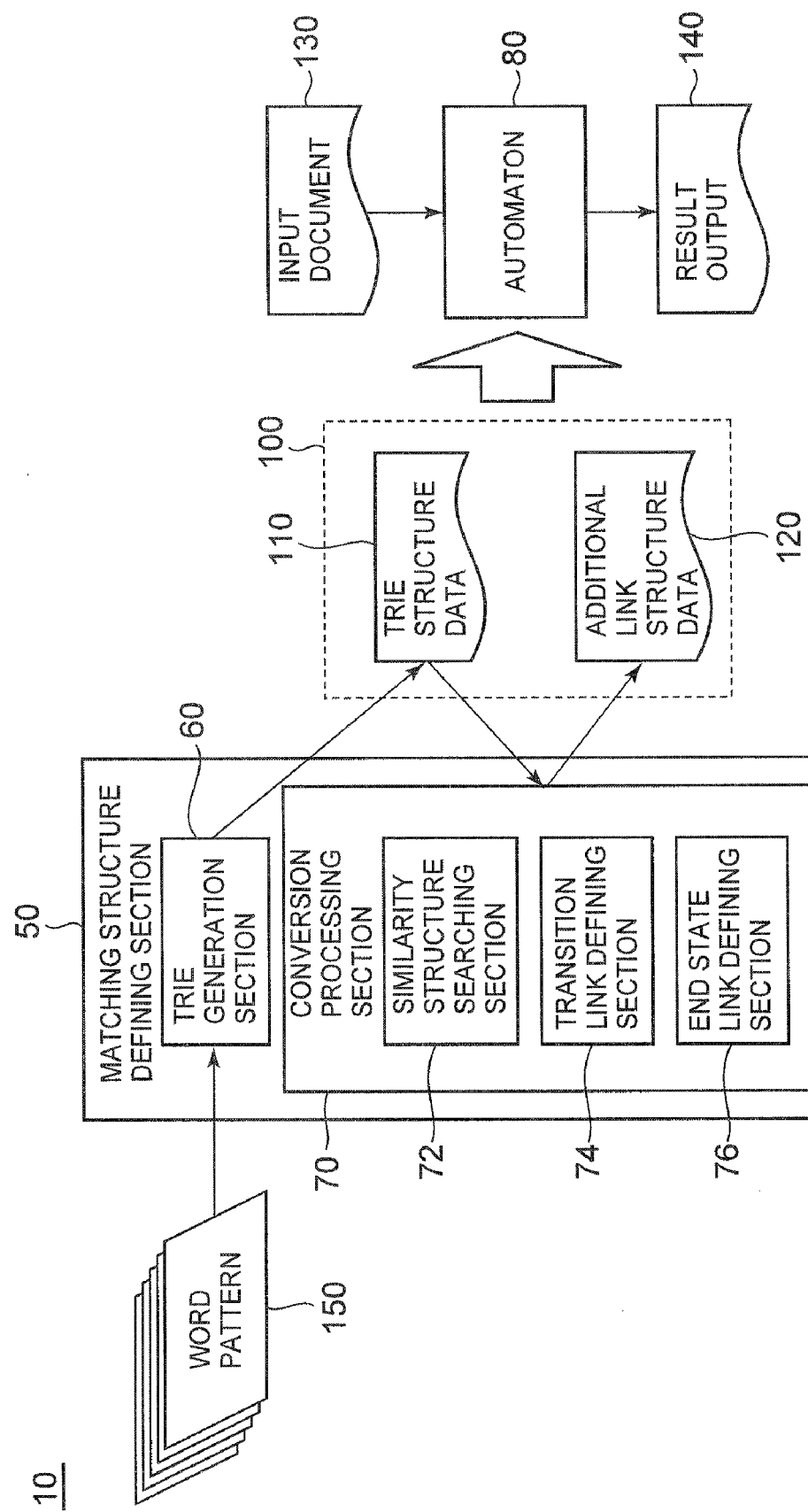

Having thus described the invention in general terms, reference will now be made to the accompanying drawings, which are not necessarily drawn to scale, and wherein:

FIG. 1 is a functional block diagram of a computer system 10 according to embodiments of the invention.

FIG. 2 contains a schematic diagram (A) illustrating a data structure of a trie generated from one or more word string patterns, and a schematic diagram (B) illustrating a data structure converted from the trie.

FIG. 3 contains schematic diagrams showing data structures of a word pattern defined to extract a desired semantic representation from input text information.

FIG. 4 contains schematic diagrams illustrating partial processing of conversion processing.

FIG. 5 contains schematic diagrams illustrating partial processing of conversion processing.

Figure 6:
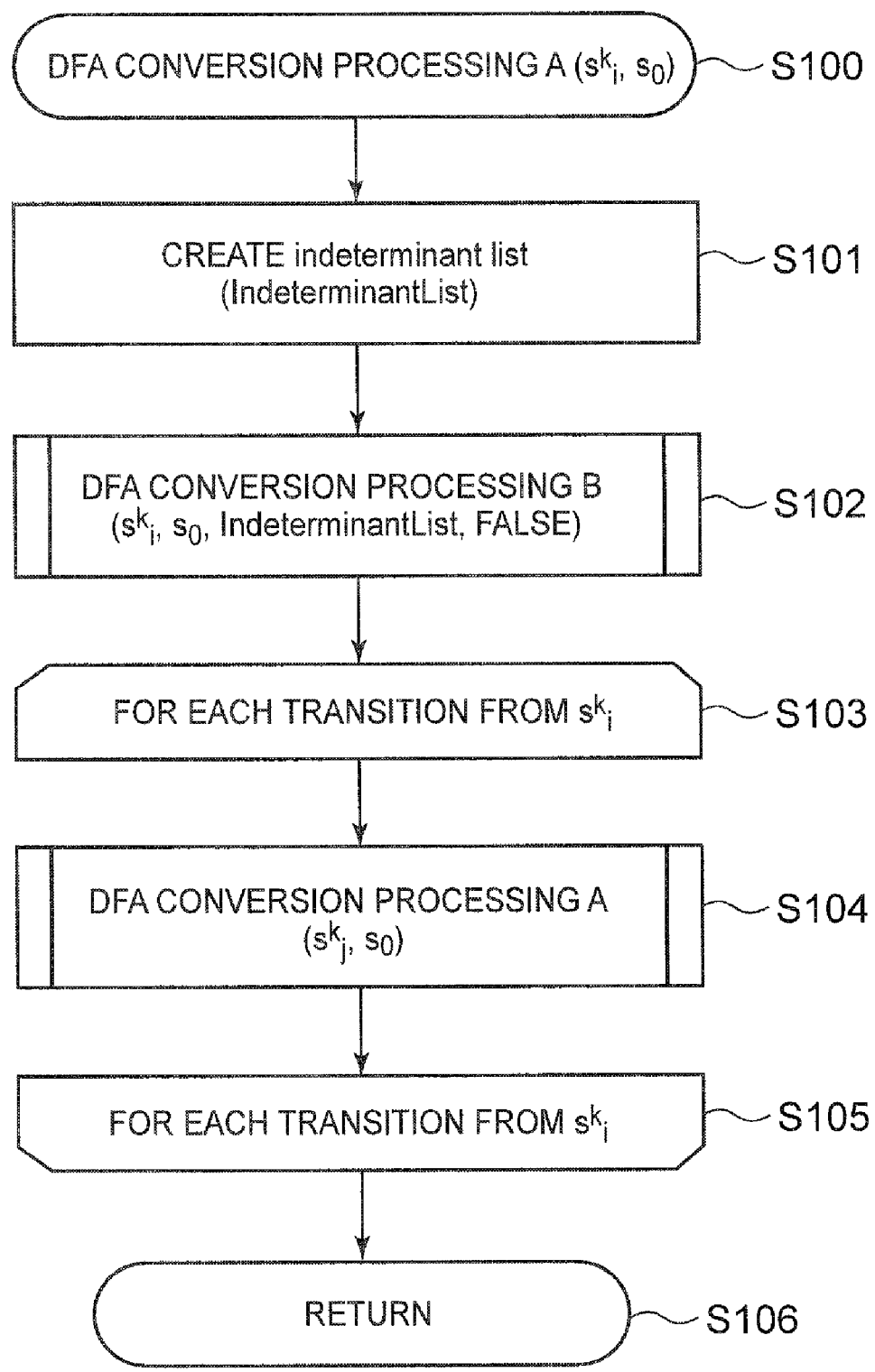

FIG. 6 is a first flowchart showing conversion processing performed by the computer system according to embodiments of the invention.

Figure 7:
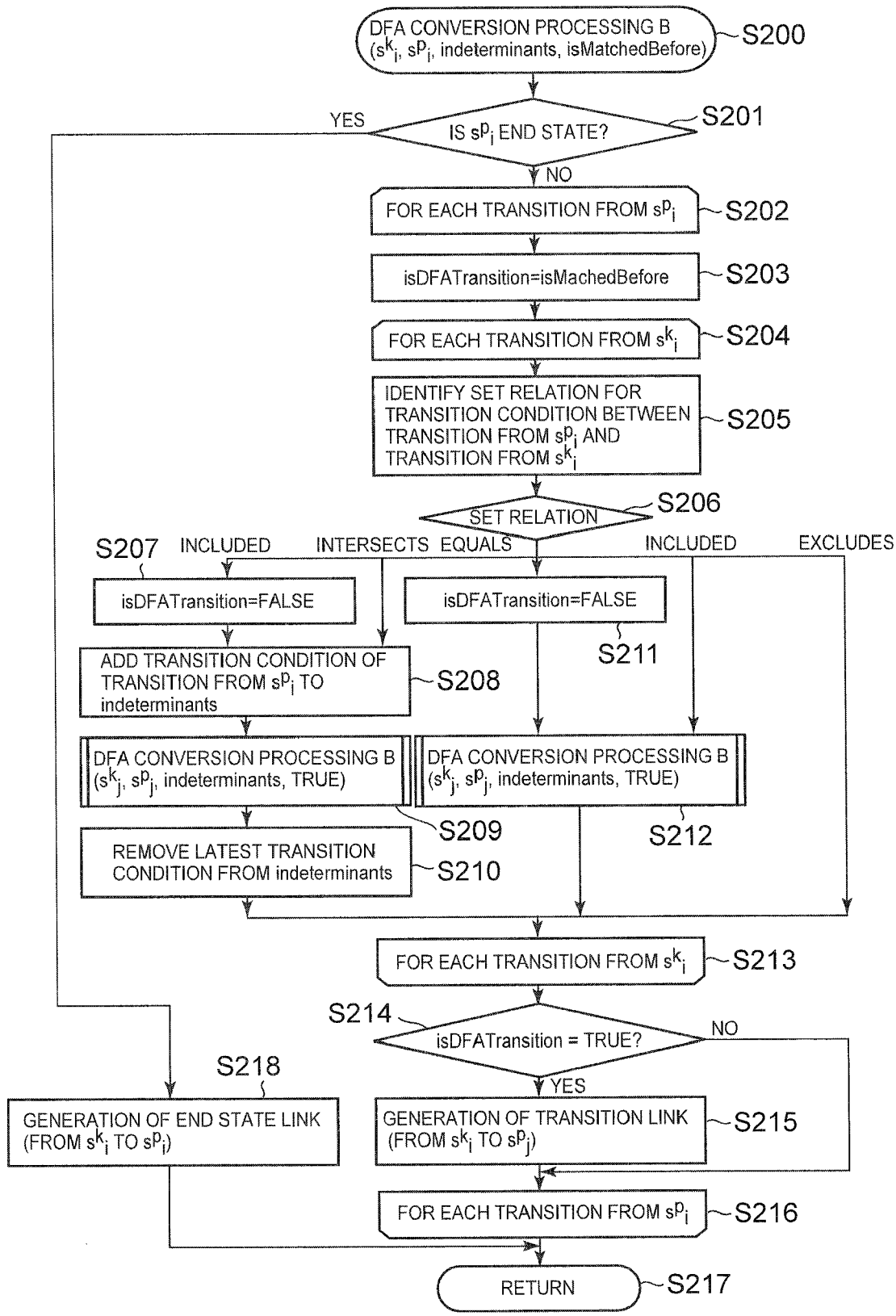

FIG. 7 is a second flowchart showing conversion processing performed by the computer system according to embodiments of the invention.

FIG. 8 is a diagram showing pseudo code of programming code to implement the conversion processing.

FIG. 9 is a diagram illustrating the data structure of input word-string patterns.

FIG. 10 contains schematic diagrams showing, as examples, (A) a trie generated from word string patterns and (B) a matching data structure converted from the trie.

Figure 11:
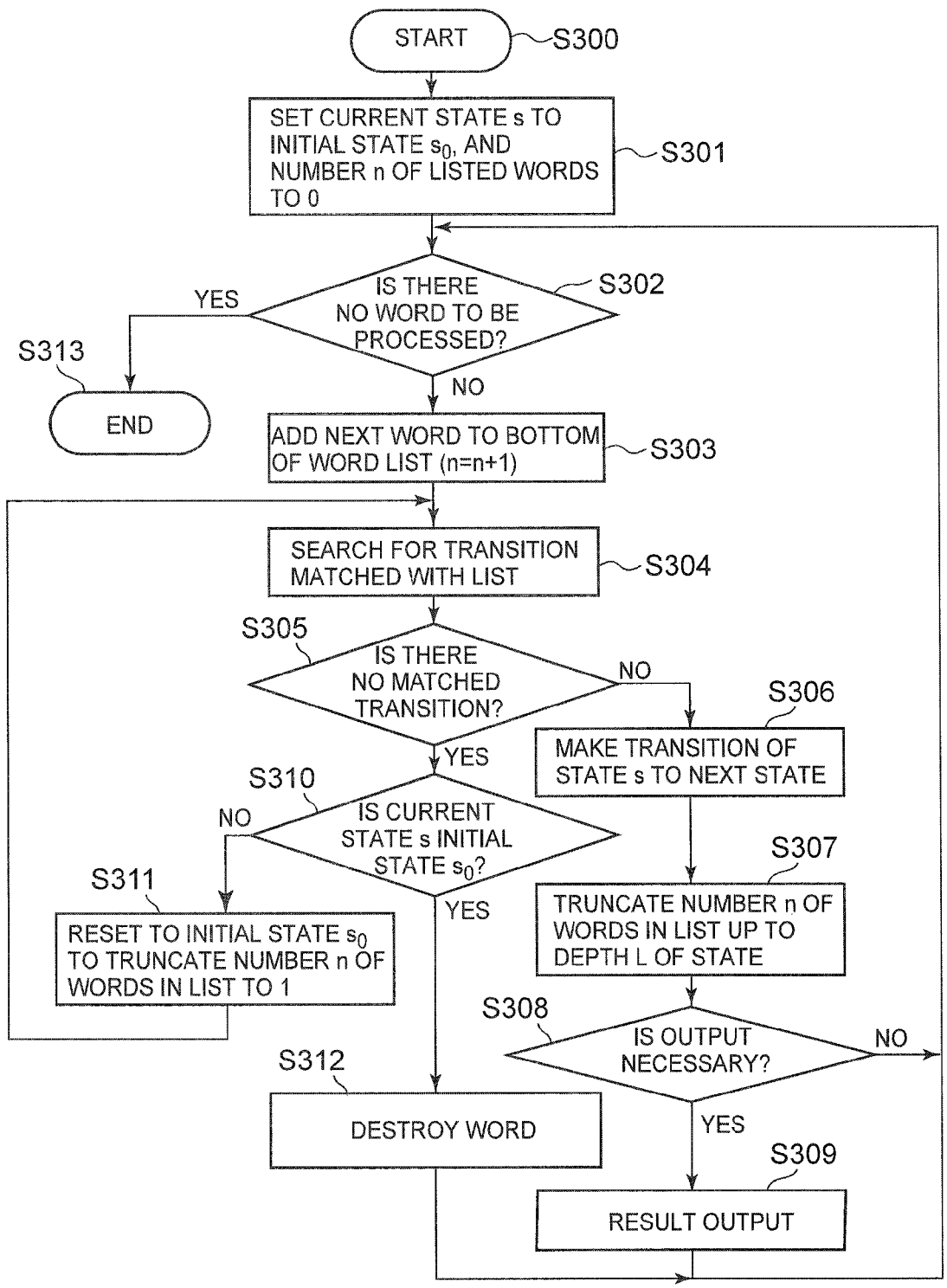

FIG. 11 is a flowchart showing pattern matching processing performed by the computer system according to embodiments of the invention.

Figure 12:
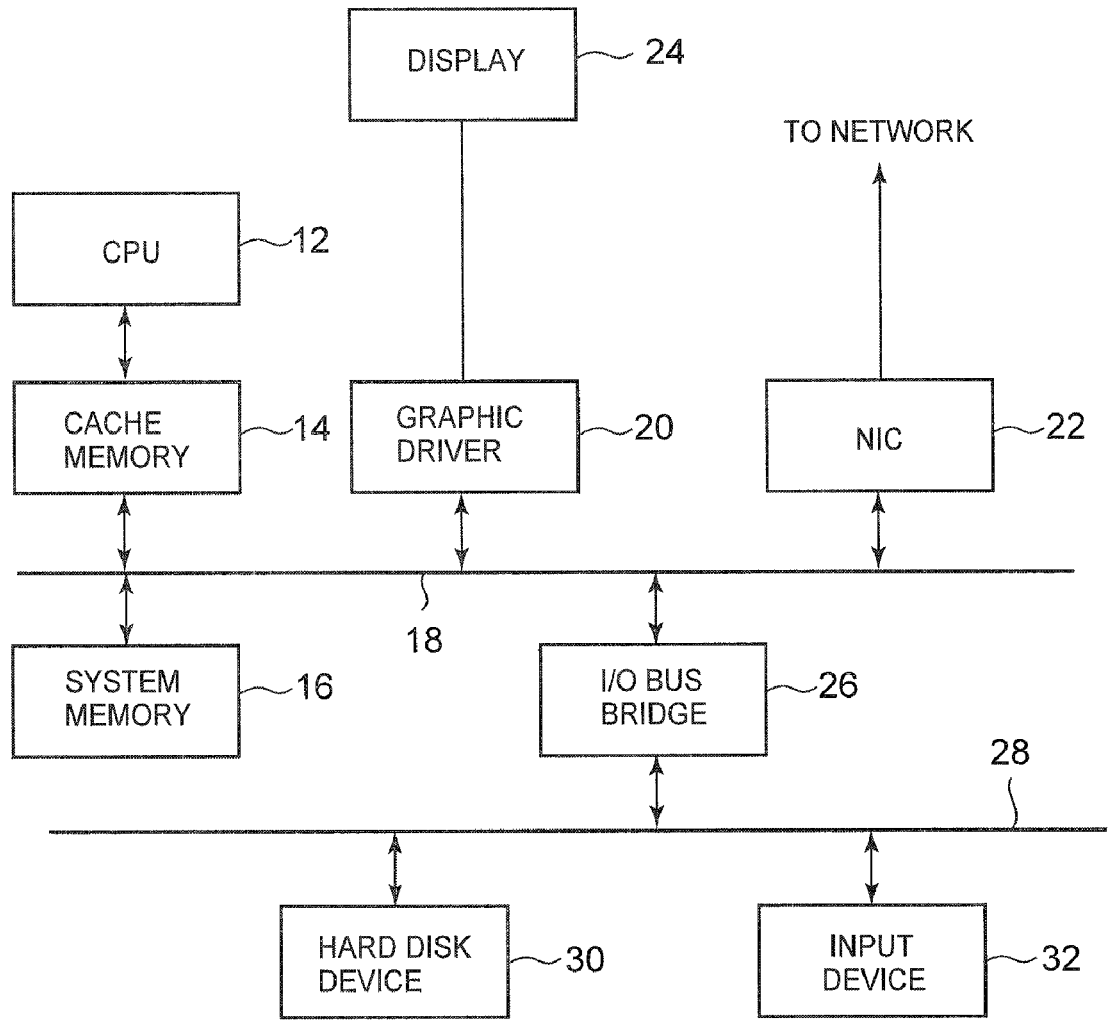

FIG. 12 is a block diagram showing a schematic hardware configuration of the computer system according to embodiments of the invention.

Figure 13:
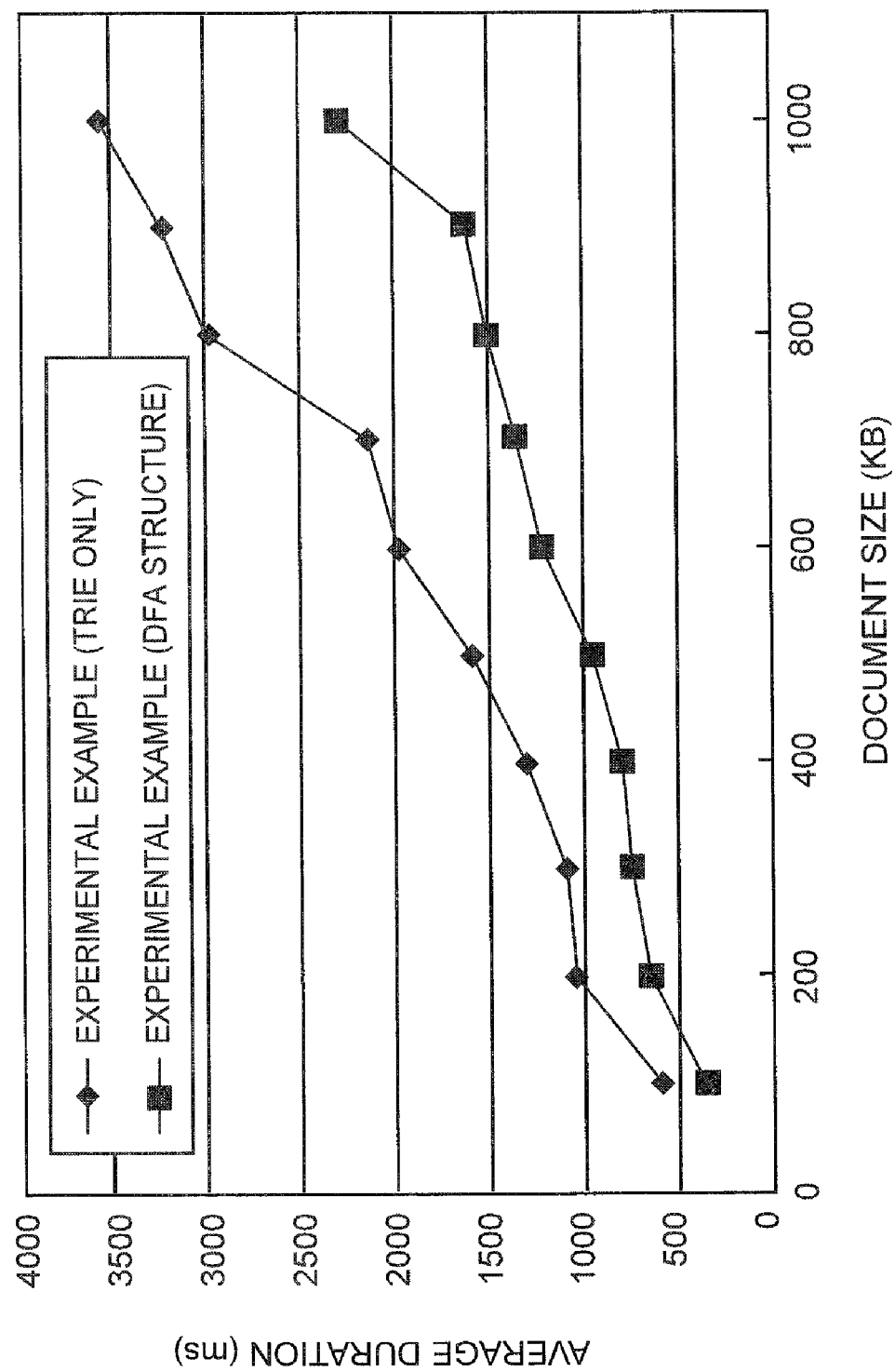

FIG. 13 is a graph showing the result of an experiment using a computer system with an automaton according to embodiments of the invention.

Figure 14:
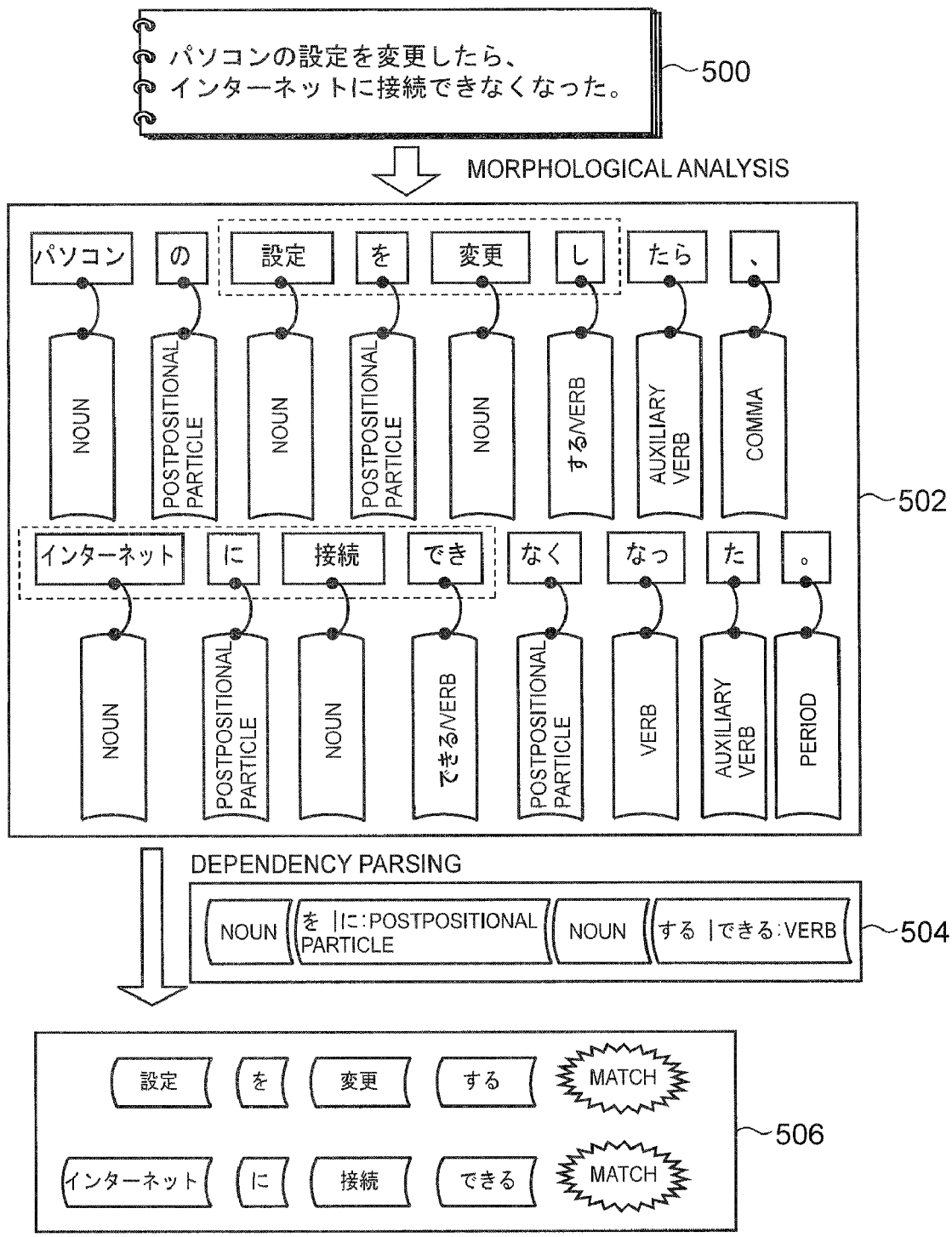

FIG. 14 is a diagram showing extraction processing for semantic dependency.

DETAILED DESCRIPTION OF THE INVENTION

While the present invention will be described below with reference to a particular embodiment, the present invention is not limited to the embodiment described below.

In the following embodiment, an automaton configured to extract a semantic representation, which matches a given pattern structure, from text information by means of pattern matching efficiently with small memory is generated. The embodiment described herein takes by way of example a computer system that implements, on a computer, the automaton configured to extract a semantic representation from text information by means of pattern matching.

FIG. 1 shows functional blocks of the computer system 10 according to embodiments of the invention. The computer system 10 shown in FIG. 1 may be configured as a personal computer, a workstation, or a mainframe, or any other suitable processor-based computing device. Each functional section (to be described later) included in the computer system 10 shown in FIG. 1 is implemented on the computer system 10 by deploying a program in a memory and executing the program to control the operation of each hardware resource.

The computer system 10 of the embodiment described herein is configured to include a matching structure defining section 50 configured to define a data structure to which an automaton 80 refers to in order to perform pattern matching. The matching structure defining section 50 is configured to include a trie generation section 60. The trie generation section 60 receives input of one or more word string patterns 150 to construct an ordered tree structure called a trie or prefix tree (hereinafter referred to as "trie") and generate trie structure data 110 defining the data structure of the trie. The word string patterns 150 are defined as lexicographic arrays of constraints on the character string expression, regular expression, or part-of-speech information of each word, the lexicographic arrays of constraints being preset for extraction of semantic representations from the text information. The following refers to FIG. 2 to describe the data structure of a trie to be generated.

FIG. 2(A) is a schematic diagram illustrating the data structure of a trie generated from the one or more word string patterns 150. The data structure of a trie 200 has a so-called tree structure comprising a root node 202 as a vertex and nodes 206, 208 connected by edges 204 each defining a sequence from an upper node to a lower node.

Each of the nodes 206 and 208 shown in FIG. 2(A) represents a state that can be taken by the automaton when the trie 200 is applied. The symbol assigned to each edge, such as "a", "b", or "b|c", represents a transition condition to be met upon transition from an upper node to a lower node. In performing pattern matching on the input word string, the automaton to which the trie 200 is applied goes from state to state through edges as paths in which the input word string matches a given transition condition, beginning from a start state $s_0$ corresponding to the root node 202, and when reaching an end state corresponding to a leaf node 208 on the tree structure, the automaton generates an result output. Thus, a word string that matches the one or more word string patterns represented by the trie 200 is extracted from the input word string. In other words, the trie 200 can be considered as a data structure representing the input one or more word string patterns 150.

However, when the trie 200 shown in FIG. 2(A) is applied to the automaton, matching needs to be made while backtracking to a matched branch point each time. Further, after completion of pattern matching for a word string starting at the word on the top of the input word string, input of a word string starting at the next word of the input word string is given to the automaton again. This results in repetition of pattern matching for word strings starting at all word positions of the input word string. Therefore, the matching structure defining section 50 of the embodiment shown in FIG. 1 is configured to include a conversion processing section 70 in order to improve the computational efficiency of pattern matching. The conversion processing section 70 generates additional link structure data 120 for adding a link between nodes of the generated trie as appropriate and defining the link added to the trie, and converts the structure of the trie to the structure of a deterministic finite-state automaton (hereinafter referred to as "DFA"). To be more specific, the conversion processing section 70 is configured to include a similarity structure searching section 72, a transition link defining section 74, and an end state link defining section 76.

Referring to FIG. 2 again, the following describes the outline of conversion processing performed by the conversion processing section 70. FIG. 2(B) illustrates a data structure 210 converted from the trie 200 shown in FIG. 2(A). The data structure 210 shown in FIG. 2(B) has a structure in which connection links between nodes other than the edges, such as a conditional transition link 214, a transition link 216, and a conditional end state link 218, are added to the trie 200 shown in FIG. 2(A).

Describing the trie 200 shown in FIG. 2(A) in more detail, the trie 200 shown in FIG. 2(A) is generated, as an example, from three word string patterns represented as pattern A "a(b|c)", pattern B "ab(a|c)", and pattern C "b(a|c)b". Here, each symbol in each pattern, i.e., "a", "b", or "(b|c)" represents one or more constraints on the character string expression, regular expression, or part-of-speech information of each word, which becomes a transition condition of an edge in the trie 200. Further, each of the symbols "(b|c)" and "(a|c)" represents a disjunction and shows an example of a word string pattern including a word set described in the regular expression as a sequence element.

Considering the trie 200 shown in FIG. 2(A), it is found that, for example, when it is confirmed that the input word string matches the pattern B "ab(a|c)" (state $s_4$), it can also be confirmed that the rear part of the input word string matches "b(a|c)" of the pattern C. Therefore, in the embodiment described herein, the transition link 216 from node 212d to node 212c in FIG. 2(B) is so added that a comparison between the following word in the input word string and the remaining "b" part of the pattern C can be continuously carried out omitting comparisons up to the "b(a|c)" part of the pattern C. Since this transition link 216 is added, it makes it possible, when the automaton reaches state $s_4$ during pattern matching, to continue to confirm that the following word meets the same transition condition as transition ($s_6 \rightarrow s_7$) and to give a transition from state $s_4$ to state $s_7$.

Further, when it is confirmed that the input word string matches the pattern A "a(b|c)," it is found that the rear part of the input word string may match up to the "b" part of the pattern C. Therefore, in the embodiment described herein, the conditional transition link 214 from node 212a to node 212b is added so that it can be confirmed that a word matching "(b|c)" in the input word string including indeterminacy matches "b" for sure to continue to make a comparison between the following word in the input word string and (a|c) of the pattern C.

Further, when it is confirmed that the input word string matches the pattern C "b(a|c)b," it is found that the rear part may match up to the tail end of the pattern A "a(b|c)." Therefore, in the embodiment described herein, the end state link 218 is so added that it can be confirmed that a word corresponding to "(a|c)" in the input word string including indeterminacy matches "a" for sure to perform the result output operation. In this example, since a constraint to be met for transition to the link destination is contained, this constraint is assigned as a reference condition, and becomes the conditional end state link.

The similarity structure searching section 72 shown in FIG. 1 uses a set operation between transition conditions assigned to the edges 204 of the trie 200 to determine likeness therebetween in order to determine nodes to which the transition link or the end state link is to be added, and a constraint to be assigned to the added link. To be more specific, the similarity structure searching section 72 first searches for a substructure in the trie 200 having a similarity relation with a substructure of any length comprising connected nodes starting from the root node 202 (hereinafter referred to as "prefix") while determining likeness between transition conditions by means of the set operation therebetween. Here, the term "similarity relation" means a relation between substructures having likeness with some uncertainty in matching. Note that a relation between identical substructures is also included in the similarity relation.

In the example shown in FIG. 2, assuming that the prefix is state string $s_5$ starting at $s_0$, state string ($s_2$), state string ($s_3$), and state string ($s_7$) are specified as substructures having similarity relations, and a transition to state $s_2$ is specified as an indeterminant. In this case, there is such uncertainty that the transition condition from $s_0$ to $s_5$ is not necessarily met even if the transition condition from state $s_1$ to state $s_2$ is met. This requires re-evaluation. On the other hand, assuming that the prefix is state string ($s_5$-$s_6$) starting at $s_0$, state string ($s_3$-$s_4$) is specified as a substructure having a similarity relation with the prefix. The details of search processing for similar structures will be described later.

Referring to FIG. 1 again, the transition link defining section 74 additionally defines, as appropriate, a transition link from the tail node of a substructure searched by the similarity structure searching section 72, which has a similarity relation with the prefix, to a corresponding child node at the tail end of the prefix, and registers it in the additional link structure data 120. At that time, an indeterminant constraint to be met to deem that a substructure having a similarity relation with the prefix exactly matches the prefix is additionally defined for the transition link.

Similarly, the end state link defining section 76 additionally defines, as necessary, an end state link from the tail node of the substructure, having the similarity relation with the prefix, to the tail node of the prefix, and registers the end state link in the additional link structure data 120. At that time, like the case of the transition link, the indeterminant constraint is defined as the condition for the end state link.

Then, the matching structure defining section 50 generates the automaton 80 for pattern matching according to a matching data structure 100 including a trie structure data 110 for defining the trie and the additional link structure data 120 for defining the additional link. The automaton 80 reads the matching data structure 100 into a memory of the computer system 10, receives input of an input document 130 including word strings, performs pattern matching processing on word string patterns predefined and represented by the matching data structure 100, extracts a desired semantic representation from the input document, and gives a result output 140.

The following describes a word pattern stored in the matching data structure 100 of the embodiment described herein and input information as a matching target. FIG. 3 is a schematic diagram showing a data structure of a word pattern defined to extract a desired semantic representation from the input text information. FIG. 3(A) shows a word string pattern defined as a sequence of constraints on the character string expression, regular expression, or part-of-speech information of each word. If the word pattern shown in FIG. 3(A) is used, the input text information can be given as a sequence of word information including the character string expression, regular expression, or part-of-speech information of each word. This character string expression, regular expression, or part-of-speech information of a word or the like can be extracted by a character string analysis technique such as morphological analysis.

On the other hand, in natural language processing, a sentence can be represented by a tree structure, called a semantic dependency tree, created by extracting a semantic dependency between words in the sentence using dependency parser. The semantic dependency tree can represent a closer relation between words, such as a subject-predicate relation, which are not always adjacent to each other in the sentence. In the present invention, the semantic dependency tree may be used as data structure of word patterns defined to extract semantic representations and of input text information. FIG. 3(B) illustrates a word tree pattern represented as a tree structure. If the word tree pattern of the tree structure shown in FIG. 3(B) is used, the input text information can also be given as a sequence of word information structured in the form of a tree.

Although computer implementation of the word tree pattern represented as the tree structure is not particularly limited, processing for converting the tree structure to a string structure, called DFS (Depth First Search) encoding, may be used to store the word tree pattern in the trie. FIG. 3(C) shows the string structure converted by the DFS encoding from the word tree pattern shown in FIG. 3(B). In the DFS encoding, a node string is generated in the depth-first order of the tree structure, and a special node is inserted at a position to return to an upper node on the tree structure. In the example shown in FIG. 3(C), the special node indicated by "−1" and representing the return to a next upper node is inserted between nodes "いつでも" and "に|へ". For details of the DFS encoding, see Mohammed J. Zaki, "Efficiently Mining Frequent Trees in a Forest", 8th ACM SIGKDD International Conference on Knowledge Discovery and Data Mining, July 2002.

Although in the embodiment described herein, such a case that the word string pattern defined as a sequence of constraints on the character expressions, regular expressions, or parts of speech of words is used is described for convenience of explanation, this does not preclude use of a word pattern represented by a tree structure in other embodiments. Processing for generating the matching data structure 100 for pattern matching and the pattern matching processing will be described in more detail below on a processing-stage basis.

(1) Generation of Trie Structure

First, the trie generation section 60 of the embodiment described herein generates a trie from the one or more input word string patterns 150. The trie is structured to include a set S of possible states, a set $E (\subset S)$ of end states, a set T $(S \times C \rightarrow S)$ of transitions. The set S of states comprises finite states $(s_0, s_1, \ldots, s_N)$ including the initial state $s_0$. An output function is defined in each element of the set E of end states, so that when the state of the automaton reaches the end state during matching, an action corresponding to the predefined output function is made to occur, and matched word string, semantic information pertaining to the word string pattern, and the like are output. The set T of transitions comprises transitions $t (=<s_i, s_j, C>)$ using state $s_i$ as a starting point and state $s_j$ as an ending point, and occurring when all transition conditions $c(\in C)$ are met. Here, an element $c (=<d, w>)$ of the transition condition is such a condition that a d-th word in a part of the input word string to be examined meets constraint w. Further, state $s_i$ has a hierarchical level $L (s_i)$ representing the depth of the transition from the state $s_i$, and a hierarchical level $L (s_0)$ of state $s_0$ is set to "0" as a reference level.

The trie generation section 60 generates a trie, according to the same procedure as in the case of character string matching using characters as constraints, from one or more word string patterns defined as a sequence of one or more constraints on the character string expression, regular expression, or part-of-speech information of each word. In practice, the trie structure can be implemented by using or extending any data structure such as a triple array structure or a double array structure.

(2) Conversion from Trie Structure to DFA Structure (2-1) Search for Self-Similarity Structure After the trie is generated from the word string patterns, the conversion processing section 70 converts the trie to a DFA. In the conversion processing, the similarity structure searching section 72 performs a comparison between a path K comprising nodes and edges in the structure of the trie using any node as an initial point (hereinafter referred to as "partial state string"), and a path P comprising nodes and edges in the structure of the trie using the root node as an initial point (hereinafter referred to as "prefix state string"), on all combinations of the partial state strings K and the prefix state strings P, to judge the necessity of a link from a partial state string K side to a prefix state string P side.

Here, the partial state string K comprises a set $S_K (\subset S)$ of states and a set $T_K$ of transitions, and the set $T_K$ of transitions comprises transitions $t^K_i (=<s^K_i, s^K_{i+1}, C^K_i>)$ from i-th state $s^K_i$ of the partial state string K to lower state $s^K_{i+1}$. The prefix state string P comprises a set $S_P (\subset S)$ of states and a set $T_P$ of transitions, and the set $T_P$ of transitions comprises transitions $t^P_i (=<s^P_i, s^P_{i+1}, C^P_i>)$ from i-th state $s^P_i$ of the prefix state string P to lower state $s^P_{i+1}$. The prefix state string P is configured to include at least a transition from the initial state $s_0$.

In the comparison processing, any state $s^K_1$ is first selected as an initial point of the partial state string K to compare transition $t^K_1$ having state $s^K_1$ as a starting point with transition $t^P_1$ having the root node $s^P_1 (=s_0)$ as a starting point in order to determine a set relation. If likeness is confirmed, then processing proceeds to the comparison between further lower transition $t^K_2$ and transition $t^P_2$. Thus, the comparison processing between transition $t^K_i$ and transition $t^P_i$ continues until likeness cannot be determined. The similarity structure searching section 72 judges the necessity of addition of a transition link, having state $s^K_i$ as a starting point and state $s^P_{i+1}$ as an ending point, and an end state link, having state $s^K_i$ as a starting point and state $s^P_i$ as an ending point, from the set relation between transition $t^K_i$ and transition $t^P_i$ in the comparison processing. Further, the similarity structure searching section 72 records an indeterminant constraint to be additionally met upon transition or reference from a node on the partial state string K side to a node on the prefix state string P side, from the set relation between transition $t^K_i$ and transition $t^P_i$ in the comparison processing.

(2-2) Set Relation

The set relation between the transition condition $C^K_i$ of the i-th transition $t^P_i$ in the partial state string K and the transition condition $C^P_i$ of the i-th transition $t^P_i$ in the prefix state string P is determined from the set operation. Table 1 shows a relationship between the set relation determined from the set operation and the necessities of transition link and recording of the indeterminant constraint.

TABLE 1

| Set Relation | Logic Statement | Explanation | Necessity of Transition Link | Additional Condition |
|---|---|---|---|---|
| $C^P_i$ equals $C^K_i$ | $C^K_i \rightarrow C^P_i$, $!C^K_i \rightarrow !C^P_i$ | If $S^K_i \rightarrow S^K_{i+1}$ is ○, then $S^P_i \rightarrow S^P_{i+1}$ is ○. If $S^K_i \rightarrow S^K_{i+1}$ is ×, then $S^P_i \rightarrow S^P_{i+1}$ is ×. | Unnecessary | — |
| $C^P_i$ includes $C^K_i$ | $C^K_i \rightarrow C^P_i$ | If $S^K_i \rightarrow S^K_{i+1}$ is ○, then $S^P_i \rightarrow S^P_{i+1}$ is ○. Even if $S^K_i \rightarrow S^K_{i+1}$ is ×, $S^P_i \rightarrow S^P_{i+1}$ is ?. | Necessary | — |
| $C^P_i$ is included in $C^K_i$ | $!C^K_i \rightarrow !C^P_i$ | Even if $S^K_i \rightarrow S^K_{i+1}$ is ○, $S^P_i \rightarrow S^P_{i+1}$ is ?. If $S^K_i \rightarrow S^K_{i+1}$ is ×, then $S^P_i \rightarrow S^P_{i+1}$ is ×. | Unnecessary | $C^P_i$ |
| $C^P_i$ intersects $C^K_i$ | — | Even if $S^K_i \rightarrow S^K_{i+1}$ is ○, $S^P_i \rightarrow S^P_{i+1}$ is ?. Even if $S^K_i \rightarrow S^K_{i+1}$ is ×, $S^P_i \rightarrow S^P_{i+1}$ is ?. | Necessary | $C^P_i$ |

TABLE 1-continued

| Set Relation | Logic Statement | Explanation | Necessity of Transition Link | Additional Condition |
|---|---|---|---|---|
| $C^P_i$ excludes $C^K_i$ | $C^K_i \rightarrow !C^P_i$ | If $S^K_i \rightarrow S^K_{i+1}$ is ○, then $S^P_i \rightarrow S^P_{i+1}$ is x. Even if $S^K_i \rightarrow S^K_{i+1}$ is x, $S^P_i \rightarrow S^P_{i+1}$ is ?. | Necessary | — |

As shown in Table 1, when the transition condition $C^P_i$ on the prefix state string P side is in an (EQUALS) relation with the transition condition $C^K_i$ on the partial state string K, if the transition from the state $s^K_i$ to the state $s^K_{i+1}$ occurs, then the transition from the state $s^P_i$ to the state $s^P_{i+1}$ occurs. On the other hand, if the transition on the state string K side does not occur, then the transition from the state $s^P_i$ to the state $s^P_{i+1}$ cannot occur. Therefore, the transition link is not added.

When the transition condition $C^P_i$ is in an (INCLUDES) relation to include the transition condition $C^K_i$, if the transition from the state $s^K_i$ to the state $s^K_{i+1}$ occurs, then the transition from the state $s^P_i$ to the state $s^P_{i+1}$ occurs. On the other hand, even if the transition on the partial state string K side does not occur, the transition from the state $s^P_i$ to the state $s^P_{i+1}$ may occur. Therefore, the transition link is added.

When the transition condition $C^P_i$ is in an (INCLUDED) relation to be included in the transition condition $C^K_i$, even if the transition from the state $s^K_i$ to the state $s^K_{i+1}$ occurs, the occurrence of the transition from the state $s^P_i$ to the state $s^P_{i+1}$ is indeterminate and, therefore, the transition condition $C^P_i$ on the prefix state string P side is associated with the hierarchical level L ($s^K_i$) of the transition on the partial state string K side, and registered in an indeterminant list storing indeterminant constraints. On the other hand, if the transition on the partial state string K side does not occur, the transition from the state $s^P_i$ to the state $s^P_{i+1}$ cannot occur and, therefore, the transition link is not added.

When the transition condition $C^P_i$ and the transition condition $C^K_i$ are in an (INTERSECTS) relation, even if the transition from the state $s^K_i$ to the state $s^K_{i+1}$ occurs, it is indeterminate as to whether the transition from the state $s^P_i$ to the state $s^P_{i+1}$ occurs or not and, therefore, the transition condition $C^P_i$ is associated with the hierarchical level L ($s^K_i$) and registered in the indeterminant list. Further, even if the transition on the partial state string K side does not occur, the transition from the state $s^P_i$ to the state $s^P_{i+1}$ may occur and, therefore, the transition link is added.

When the transition condition $C^P_i$ and the transition condition $C^K_i$ are in an (EXCLUDES) relation, if the transition from the state $s^K_i$ to the state $s^K_{i+1}$ occurs, the transition from the state $s^P_i$ to the state $s^P_{i+1}$ cannot occur. On the other hand, even if the transition on the partial state string K side does not occur, the transition from the state $s^P_i$ to the state $s^P_{i+1}$ may occur. Therefore, the transition link is added.

In searching for a self-similarity structure by means of the similarity structure searching section 72, a structure with a transition condition having any relation other than EXCLUDES (i.e., any of EQUALS, INCLUDES, INCLUDED, and INTERSECTS relations) is judged to have likeness, and processing proceeds to further comparison in lower levels. Thereby, a similarity structure having likeness but with some uncertainty of matching is identified.

(2-3) Generation of Conditional Transition Link

As mentioned above, even if a word has not matched the transition condition $C^K_i$ on the partial state string K side during pattern matching, while it has a possibility to match the transition condition $C^P_i$ on the prefix state string P side, the additional transition link is generated with the state $s^K_i$ on the partial state string K side being used as a starting point and the state $s^P_{i|1}$ on the prefix state string P side being used as an ending point. The similarity structure searching section 72 searches for a set of a partial state string K and a prefix state string P, which meets such conditions that there is the partial state string K all the transition conditions of which are not in the EXCLUDES relation with the prefix state string P, and that all the transitions having the tail node of the partial state string K as the starting point are in neither EQUALS nor INCLUDED relations with the transitions having the tail node of the prefix state string P as the starting point.

If the set is found, the similarity structure searching section 72 calls the transition link defining section 74 to cause it to generate an additional transition $t^{ct} (=<s^K_n, s^P_{n+1}, C_I \cap C^P_n>)$. Here, n identifies a tail end of a structure having a similarity relation, i.e., the state $s^K_n$ corresponds to a tail node at which the likeness of the partial state string K as a current processing target is confirmed and the state $s^P_{n+1}$ corresponds to a child node of the tail node $s^P_n$ of the prefix state string P. The set $C_I$ of transition conditions comprises transition conditions having the INCLUDED or INTERSECTS relation with the transition condition $C^{Ki}$ among the transition conditions $C^P_i$ of the prefix state string P, and represents constraints that the indeterminants should meet. The transition condition $C^P_n$ is a transition condition $C^P_n$ for a transition $t^P_n (=<s^P_n, s^P_{n-1}, C^P_n>)$ from the tail node $s^P_n$ of the prefix state string P to its child node $s^P_{n+1}$. The transition $t^{ct}$ serves to save memory like the Aho-Corasick failure function, and further gives a DFA feature to make a transition only once for a word reading.

(2-4) Generation of Conditional End State Link

As mentioned above, the additional end state link is a reference link to be generated as a link from the state $s^K_i$ to the state $s^P_i$ on condition that when a word matches the transition condition $C^K_i$ on the partial state string K side during pattern matching, it has a possibility to match the transition condition $C^P_i$ on the prefix state string P side. The similarity structure searching section 72 searches for a set of a partial state string K and a prefix state string P, which meets such conditions that there is the partial state string K all the transition conditions of which are not in the EXCLUDES relation with the prefix state string P, and that the tail node of the prefix state string P is in the end state.

If the set is found, the similarity structure searching section 72 calls the end state link defining section 76 to set the tail node $s^K_n$ of the partial state string K to a conditional end state $s^K_e (=<s^P_n, C_I>)$. The condition set $C_I$ represents constraints that the indeterminants should meet like the case of the conditional transition link, and comprises transition conditions having the INCLUDED or INTERSECTS relation with the transition condition $C^K_i$ among the transition conditions $C^P_i$. The conditional end state $s^K_e$ is represented as a conditional reference to $s^P_n$. When the automaton reaches the conditional end state $s^K_e$ in the pattern matching processing, the automaton provides a result output in the same manner as in the case of other end states if the indeterminant constraints $C_I$ are met. This result output can be provided by referring to an output function defined in the end state $s^P_n$ of the reference destination.

The state $s^K_n$ of the tail end of the partial state string K becomes an end state only after being generated by the end state link defining section 76. On the other hand, the state $s^K_n$ of the partial state string K which is a current processing target during searching is also selected as the tail node $s^P_n$ of the prefix state string P in other processing. Therefore, if the tail node $s^P_n$ of the prefix state string P becomes the end state in later processing, the state $s^K_n$ of the partial state string K needs to be the end state as well. Therefore, the similarity structure searching section 72 records the state $s^K_n$ as having a possibility to be the end state during searching regardless of whether the tail node of the prefix state string P is in the end state or not, and after the searching processing goes around, the trie is re-searched. Then, it is confirmed that the node recorded as having the possibility to be the end state is in the end state for sure, and the end state link defining section 76 is called to decide the generation of the conditional end state $s^K_e$.

(2-5) Optimization of Data Structure

As mentioned above, the transition link defining section 74 generates, according to the set relation of each transition, an additional transition from the tail node of the partial state string K to the child node at the tail end of the prefix state string P on condition that they are in the similarity relation. However, according to the processing of the embodiment described herein, since each additional transition link may have a different indeterminant constraint, plural additional transition links having different transition destinations may be defined for one transition source node. On the other hand, in the pattern matching, it is preferable that a transition be made to a transition destination having a longer prefix, i.e., deeper hierarchical level as much as possible, among the matched transitions in order to leave the context that the automaton holds. Therefore, in the link structure data 120, additional transition links are sorted in order of depth in the hierarchical level. This makes it possible to make a transition to the longest prefix efficiently upon transition.

(3) Illustration of DFA Conversion Processing

The following illustrates a procedure of conversion processing with reference to FIG. 4 and FIG. 5 by focusing on partial processing operations in the conversion processing. FIG. 4 and FIG. 5 are schematic diagrams illustrating the partial processing operations in the conversion processing.

FIG. 4(A) shows processing related to the partial state string K and the prefix state string P having the EQUALS relation. In FIG. 4(A), a condition (b) of transition to state $s_2$ and a condition (b) of transition to state $s_6$ are determined from the set operation to be equal each other. In this case, since no additional transition link from state $s_2$ is generated from the relation shown in Table 1, the similarity structure searching section 72 records that the likeness of the determined part is obtained. On the other hand, in the next comparison, since there is no child at state $s_2$, a set operation between an empty condition ($\Phi$) and a condition (a|b) of transition to state $s_7$ of the prefix state string P is performed and it is determined as EXCLUDES.

Since one or more transition conditions having likeness are confirmed in the determination up to this point, and since there is no child at state $s_2$, the transition link defining section 74 generates a transition link from state $s_2$ ($s^K_n$) to the child node $s_7$ ($s^P_{n+1}$) of the corresponding state $s_6$ ($s^P_n$). Because of this transition link, the transition from state s2 to state s7 is also tried during pattern matching. Since there is no child having a relation other than EXCLUDES at state $s_2$, the similarity structure searching section 72 completes the processing related to the current combination of the partial state string K and the prefix state string P, and proceeds to processing for the next combination (K, P).

FIG. 4(B) shows processing related to the partial state string K and the prefix state string P having the set relation of INCLUDES. In FIG. 4(B), since it is determined from the set operation that a condition (b) of transition to state $s_3$ and a condition (b) of transition to state $s_6$ are equal to each other (EQUALS), the similarity structure searching section 72 records only that the likeness is obtained.

In the next comparison, a set operation between a condition (a) of transition from state $s_3$ to state $s_4$ of its child and a condition (a|b) of transition to $s_7$ of the prefix state string P is performed. In this case, it is determined that the relation is INCLUDES. Further, since state $s_3$ has another child node $s_5$, the necessity of the additional transition link is determined after the determination on a condition of transition to state $s_5$ of its child. Since one or more transition conditions having likeness are confirmed in the determination up to this point, and since all the transitions from state $s_3$ have neither the EQUALS relation nor the INCLUDED relation with the transition at the tail end of the prefix state string P, the transition link defining section 74 generates a transition link from state $s_3$ ($s^K_n$) to state $s_7$ ($s^P_{n+1}$). Because of this transition link, the transition from state $s_3$ to state $s_7$ is also tried if it cannot match any transition condition of the trie from state $s_3$ during pattern matching.

In FIG. 4(B), since there is no child node at state $s_4$, a set operation between the empty condition ($\Phi$) and a condition (b|c) of transition to $s_8$ of the prefix state string P is performed in the next comparison, and it is determined as EXCLUDES. In this case, since one or more transition conditions having likeness are confirmed in the determination up to this point, and since there is no child node at state $s_4$, the transition link defining section 74 generates a transition link from state $s_4$ ($s^K_n$) to state $s_8$ ($s^P_{n+1}$). Because of this transition link, the transition from state $s_4$ to state $s_8$ is also tried during pattern matching.

FIG. 5(A) shows processing related to the partial state string K and the prefix state string P having the set relation of INCLUDED. In FIG. 5(A), a condition (a|b) of transition to state $s_7$ and a condition (a) of transition to state $s_1$ are determined as INCLUDED from the set operation. Therefore, the similarity structure searching section 72 associates the hierarchical level L ($s_6$) indicative of the depth of transition from state $s_6$ to state $s_7$ with the transition condition (a) on the prefix state string P side, and records it in the indeterminant list. Further, since INCLUDED is determined from the set operation, the similarity structure searching section 72 records only that the likeness is obtained without generating any transition link from state $s_6$.

In the next comparison, a set operation between a condition (b|c) of transition from state $s_7$ to state $s_8$ of its child and a condition (b) of transition from state $s_1$ to state $s_2$ of the prefix state string P is performed, and the INCLUDED relation is determined. The similarity structure searching section 72 associates the hierarchical level L ($s_7$) indicative of the depth of transition from state $s_7$ to state $s_8$ with the transition condition (b) on the prefix state string P side, and records it in the indeterminant list. Although one or more transition conditions having likeness are confirmed in the determination up to this point, since the INCLUDED relation is determined in this comparison, the similarity structure searching section 72 records that the likeness is obtained without generating any transition link from state $s_7$.

On the other hand, since state $s_2$ on the prefix state string P side is the end state, the end state link defining section 76 sets state $s_8$ on the partial state string K side to a conditional end state with the constraints recorded in the indeterminant list up to this time being used as a reference condition. In this example, "W1=a & W2=b" (where WL represents an additional constraint on the position of the hierarchical level L) is added as the reference condition.

FIG. 5(B) shows processing related to the partial state string K and the prefix state string P having the INTER- SECTS relation. In FIG. 5(B), it is determined from the set operation that a condition (b) of transition to state s3 and a condition (b) of transition to state s6 are equal to each other (EQUALS). Therefore, in this comparison, it is recorded only that the likeness is obtained.

In the next comparison, a set operation between a condition (a|c) of transition from state $s_3$ to state $s_5$ of its child and a condition (a|b) of transition from $s_6$ to $s_7$ of the prefix state string P is performed, and the INTERSECTS relation is determined. Since one or more transition conditions having likeness are confirmed in the determination up to this point, and since all the transitions from state $s_3$ are in neither EQUALS nor INCLUDED relation with the transition at the tail end of the prefix state string P, a transition link from state $s_3$ ($s^K_n$) to state $s_7$ ($s^P_{n+1}$) of a corresponding child node of state $s_6$ is generated. On the other hand, since the INTERSECTS relation has been determined, the hierarchical level L ($s_3$) indicative of the depth of transition from state s3 is associated with the transition condition (a|b) on the prefix state string P side and recorded in the indeterminant list.

In FIG. 5(B), since there is no child node at state $s_5$, a set operation between the empty condition (Φ) and a condition (b|c) of transition to $s_8$ of the prefix state string P is performed, and EXCLUDES is determined. In this case, since one or more transition conditions having likeness are confirmed in the determination up to this point, and since there is no child node at state $s_4$, the transition link defining section 74 generates a transition link from state $s_5$ ($s^K_n$) to state $s_8$ ($s^P_{n+1}$). In this example, a transition condition (W2=a|b) is added as an additional condition. Thus, the added transition link becomes a conditional transition link.

(4) Entire Flow of DFA Conversion Processing

The following describes the entire processing flow of conversion from the trie to a DFA structure with reference to FIG. 6 and FIG. 7. FIG. 6 is a first flowchart showing conversion processing performed by the computer system 10 of the embodiment described herein. After completion of generation of the trie, the processing shown in FIG. 6 is called by the matching structure defining section 50 and started at step S100. DFA conversion processing A shown in FIG. 6 is started by giving, as arguments, state $s^K_i$ which is a starting point of the determination processing for the partial state string K and state $s_0$ which is a starting point of the determination processing for the prefix state string P.

In step S101, an indeterminant list is newly generated for the processing using the state $s^K_i$ as the starting point. In step S102, the above-mentioned state $s^K_i$ of the starting point, state $s_0$, and generated indeterminant list are given as arguments, and DFA conversion processing B shown in FIG. 7 is called. The last argument is a flag representing whether likeness has been confirmed up to this time, and when it is called from DFA conversion processing A, "FALSE" is given as an initial value. DFA conversion processing B will be described in detail later.

In a loop from step S103 to step S105, processing step S104 in the loop is repeated for each transition having state $s^K_i$ as its origin. In step S104, DFA conversion processing A itself is recursively called for the transition having state $s^K_i$ as its origin. In the recursive calling, state $s^K_j$ that follows state $s^K_i$ by the transition and state $s_0$ which is a starting point of the determination processing for the prefix state string P are given as arguments. When the loop from step S103 to step S105 is completed and control is returned, the DFA conversion processing A is ended to pass control to the calling processing in step S106.

The recursive DFA conversion processing A shown in FIG. 6 starts determination processing between the partial state string K having, as starting points, all nodes below state $s^K_i$ given first as a starting point that construct the trie, and the prefix state string P. The following refers to FIG. 7 to describe DFA conversion processing B called at step S102 shown in FIG. 6.

FIG. 7 is a second flowchart showing conversion processing performed by the computer system 10 of the embodiment described herein. DFA conversion processing B shown in FIG. 7 is called at step S102 shown in FIG. 6, or recursively called from the processing itself, and started at step S200. If it is called from DFA conversion processing A, the starting point $s^K_i$ on the partial state string K side, the starting point $s_0$ on the prefix state string P side, the newly generated indeterminant list (IndeterminantList), and a default value "FALSE" of the flag representing whether likeness has been confirmed up to this time are passed. In the processing shown in FIG. 7, the arguments are expressed as state $s^k_i$, state $s^p_i$, indeterminants, and flag (isMatchedBefore), respectively.

In step S201, it is determined whether the given state $s^p_i$ on the prefix state string P side corresponds to the end state or not. If it is determined in step S201 that state $s^p_i$ is the end state (YES), processing branches to step S218. On the other hand, if it is determined in step S201 that state $s^p_i$ is not the end state (NO), processing branches to step S202.

In a loop from step S202 to step S216, processing in the loop is repeated for each transition having state $s^p_i$ as its origin. In step S203, a flag (isDFATransition) representing the necessity of additional transition is set to the initial value "FALSE." Then, in a loop from step S204 to step S213, processing in the loop is repeated for each transition having state $s^k_i$ as its origin.

In step S205, the set operation is used to identify a set relation for a combination of each transition from state $s^p_i$ and each transition from state $s^k_i$, respectively specified by the loop from step S202 to step S216 and the loop from step S204 to step S213. In step S206, a determination is made according to the indentified set relation to cause processing to selectively branch.

In step S206, if it is determined that the set relation is INCLUDED, processing selectively branches to step S207. In step S207, the flag (isDFATransition) representing the necessity of transition is written over the value "FALSE," and in step S208, the transition condition $C^p_i$ of the transition from state $s^p_i$ specified by the loop is associated with the hierarchical level L ($s^k_i$) on the partial state string K side, and recorded in the indeterminant list (indeterminants).

In step S209, DFA conversion processing B recursively calls itself. In the recursive calling, state $s^k_j$ and state $s^p_j$ that follow the transitions specified by the loop, the indeterminant list (indeterminants) in which an element is recorded in step S208, and a value "TRUE" of the flag (isMatchedBefore) representing that likeness has been confirmed are given as arguments. Returning control from the recursive calling, the transition condition $C^p_i$ added in step S208 is removed in step S210 from the indeterminant list (indeterminants), and processing proceeds to step S213.

In step S206, if it is determined that the set relation is INTERSECTS, processing selectively branches to step S208. In step S208, like in the case that it is determined that the set relation is INCLUDED, the transition condition $C^p_i$ of the transition from state $s^p_i$ specified by the loop is associated with the hierarchical level L ($s^k_i$) on the partial state string K side, and recorded in the indeterminant list (indeterminants).

In step S209, the same arguments as in the case that it is determined that the set relation is INCLUDED are given, and DFA conversion processing B recursively calls itself. Returning control from called processing, the transition condition $C^p_i$ added in step S208 is removed in step S210 from the indeterminant list (indeterminants), and processing proceeds to step S213.

In step S206, if it is determined that the set relation is EQUALS, processing selectively branches to step S211. In step S211, the flag (isDFATransition) representing the necessity of transition is written over "FALSE," and in step S212, the same arguments as in the case that it is determined that the set relation is INCLUDED or INTERSECTS are given, and DFA conversion processing B recursively calls itself. Returning control from the recursive calling, processing proceeds to step S213.

In step S206, if it is determined that the set relation is INCLUDES, processing selectively branches to step S212. In step S212, like in the case that it is determined that the set relation is EQUALS, DFA conversion processing B recursively calls itself, control is returned from the recursive calling, and processing proceeds to step S213. On the other hand, if it is determined in step S206 that the set relation is EXCLUDES, processing selectively branches to step S213. The recursive calling in step S209 and step S212 is nested until all transitions become the EXCLUDES relation, or state $S^p_i$ reaches the end state.

Exiting the loop from step S204 to step 213, processing proceeds to step S214. In step S214, the necessity of transition is determined from the flag (isDFATransition). This flag (isDFATransition) holds "FALSE" when the transitions having state $s^k_i$ as the origin include at least one transition having either the INCLUDED or INTERSECTS relation. Further, the flag (isDFATransition) also holds "FALSE" when all the transitions called from DFA conversion processing A shown in FIG. 6 and having state $s^k_i$ as the origin have the EXCLUDES relation, because likeness has never been confirmed. On the other hand, if one or more transition conditions having likeness are confirmed and the transitions having state $s^k_i$ as the origin are in neither EQUALS nor INCLUDED relation with all the transitions having state $s^k_i$ as the origin, the flag (isDFATransition) holds "TRUE."

In step S214, if it is determined that the additional transition is necessary (YES), processing branches to step S215. In step S215, the transition link defining section 74 is called to generate a transition link from state $s^k_i$ specified from the context of the recursive calling to state $s^p_j$ specified by the loop and from the context of the recursive calling. Then, processing proceeds to step S216. When a transition link is generated in step S215, a transition condition element recorded in the indeterminant list (indeterminants) is added as a condition of the transition link. For example, after an element is added once in step S208 as being in the INCLUDED or INTERSECTS relation and recursive calling is made in step S209, if processing proceeds to step S215 on condition that it is determined in the recursive calling processing that all the transitions are in the INTERSECTS, INCLUDES, or EXCLUDES relation, the element remains in the indeterminant list (indeterminants).

On the other hand, if it is determined in step S214 that the additional transition is unnecessary (NO), processing branches directly to step S216. Exiting the loop from step S202 to step S216, processing proceeds to step S217 to end the DFA conversion processing B and return control to the calling processing.

In step S201, if it is determined that state $s^p_i$ is the end state (YES), processing branches to step S218 to generate an end state link from state $s^k_i$ specified from the context of the recursive calling to state $s^p_j$. Then, processing proceeds to step S217 to return control to the calling processing for the DFA conversion processing B. When an end state link is generated in step S218, a transition condition element recorded in the indeterminant list (indeterminants) is added as a reference condition.

FIG. 8 shows pseudo code of programming code for implementing the conversion processing shown in FIG. 6 and FIG. 7. In the pseudo code shown in FIG. 8, a method defined in a statement "void makeDFATransitions(State state, State initState)" corresponds to DFA conversion processing A shown in the flowchart of FIG. 6, and a method defined in a statement "void makeDFATransitions (State srcState, State destState, List<Pattern> indeterminants, boolean isMatchedBefore)" corresponds to DFA conversion processing B shown in the flowchart of FIG. 7. Further, in the pseudo code shown in FIG. 8, "generateEndTransition (srcState, destState, indeterminants)" and "genDFATransition (srcState, destTr, indeterminants)" correspond to methods for performing processing of the end state link defining section 76 and the transition link defining section 74, respectively.

(5) Example of DFA Conversion Output

The following illustrates a result output after conversion processing with reference to FIG. 9 and FIG. 10. FIG. 9 illustrates the data structure of word string patterns to be input. The word string patterns shown in FIG. 9 are described by XML (eXtensible Markup Language) tags, and defined by <mi> tags. Words and their order included in the word string patterns are defined by <w> tags nested in <mi> tags, an str attribute indicates a character string expression (type face) of a word appearing in a sentence and a lex attribute indicates a character string expression (original form) of a word in the dictionary. Regular expressions can be included in the respective expressions. In other words, these word string patterns are designed to match the type faces of words appearing in the sentence by the str attributes and the dictionary expressions (original forms) of words by the lex attributes, and constructed to include constraints on various information included in the words.

FIG. 10(A) schematically illustrates an example of a trie generated from the word string patterns shown in FIG. 9, and FIG. 10(B) schematically illustrates an example of a matching data structure converted from the trie. When the word patterns shown in FIG. 9 are input, a trie 220 comprising plural nodes connected by edges indicated by solid arrow lines to the root node as shown in FIG. 10 is first generated. The number assigned to each node in FIG. 10 corresponds to an id attribute value of the <w> tag in the data structure of the word string patterns shown in FIG. 9, and the symbols assigned to the edges correspond to the values of the str attributes and the lex attributes of the <w> tags.

Further, FIG. 10(A) shows a node string 222 extracted from the trie 220. A condition of transition to node (6) in the node string 222 has likeness with a condition of transition to node (17) of the trie 220. Further, a condition of transition from node (6) to node (7) in the node string 222 has likeness with a condition of transition from node (17) to the end state node (18) of the trie 220. Therefore, an end state link from node (7) to the end state node (18) is generated. Then, an indeterminant constraint (W1, W2) on the partial state string K is assigned appropriately to its reference condition.

Further, a condition of transition to node (7) in the node string 222 has the EXCLUDES relation with a condition of transition from node (17) to node (20) of the trie 220. Therefore, a transition link from parent node (6) of node (7) to node (20) is generated. Then, an indeterminant constraint (W1) on the partial state string K is assigned appropriately to its transition condition. Similarly, a condition of transition to the end state node (8) in the node string 222 has the EQUALS relation with a condition of transition to node (2) of the trie 220, and since there is no child node of node (8), transition links from node (8) to node (3) and node (6) are generated. FIG. 10(B) illustrates a matching data structure eventually obtained from the word string patterns shown in FIG. 9.

(6) Pattern Matching Processing

The following refers to FIG. 11 to describe trie generation processing performed by the matching structure defining section 50 of the embodiment and processing of the automaton 80 configured to perform pattern matching by referring to the matching data structure 100 defined by the conversion processing.

The automaton 80 of the embodiment is used together with a word list holding input words. The word list is emptied each time processing returns to the initial state $s_0$, and sequentially stores a word matched each time a transition is made from state to state. In the transition through a transition link, the length of the word string stored in the word list is truncated according to the hierarchical level of the state of the transition destination to make the number of indexes in the word list match the number of paths of the trie. Thus, the hierarchical level of an element in the indeterminant list matches the position of a word in the word list to be compared, enabling efficient pattern matching.

FIG. 11 is a flowchart showing pattern matching processing performed by the computer system 10 of the embodiment. Processing shown in FIG. 11 is started at step S300 after the automaton 80 is called in response to an external command or the like. In step S301, the state s of the automaton 80 is set to the initial state $s_0$ corresponding to the root node to allocate a storage area for an empty word list in which the number n of held words is 0. In step S302, it is determined whether there is no word in the input document 130 to be processed next.

In step S302, if it is determined that there is no word to be processed (YES), a branch is taken to step S313 to end the pattern matching processing. On the other hand, if it is determined in step S302 that the word to be processed exists (NO), processing proceeds to step S303. In step S303, the next word is read from the input document 130, and temporarily added to the bottom of the word list in order to compare the word with a transition condition.

In step S304, the automaton 80 refers to the matching data structure 100 to compare a condition of transition having the current state s as its origin with the word added to the bottom of the word list in order to search for a matched transition. At this time, in the case of an added conditional transition link, since the position of an indeterminant is indicated by the hierarchical level, it is also determined whether a word located in the corresponding position of the word list meets a constraint to be met. In step S305, the automaton 80 determines whether there is no matched transition or not. In step S305, if it is determined that there is no matched transition (YES), processing branches to step S310. On the other hand, if a matched transition is found in step S305 (NO), processing branches to step S306.

In step S306, the automaton 80 makes a transition to the next state through the transition found. In this case, if plural transitions meeting the transition condition are found, a transition to a state deeper in the hierarchical level takes precedence. Further, at this time, the word temporarily stored for comparison in the word list is fixed as a matched word. In step S307, the automaton 80 deletes words appropriately from the top of the word list according to the hierarchical level of the transition destination to truncate the length of the stored word string. If the transition corresponds to a normal edge of the trie, the number n of words is maintained without truncation. On the other hand, if the transition is a transition link added between nodes, the length of the word string is truncated according to the hierarchical level of the transition destination.

In step S308, the automaton 80 determines whether the state after transition is the end state or not, i.e., whether the result output is necessary or not. In step S308, if it is determined that the result output is necessary (YES), processing branches to step S309. In step S309, the automaton 80 takes action according to the output function defined for this end state to give the result output 140. At this time, since the position of an indeterminant is indicated by the hierarchical level, it is determined whether the conditional end state link meets a constraint to be met by a word located in the corresponding position in the word list. Then, after step S309, processing is looped to step S302 again to perform processing for the next word. On the other hand, if it is determined in step S308 that the output is unnecessary (NO), processing is looped to step S302 to perform processing for the next word.

In step S305, if it is determined that there is no matched transition (YES), processing branches to step S310. In step S310, the automaton 80 determines whether the current state s is the initial state $s_0$ or not. If it is determined in step S310 that it is the initial state $s_0$ (YES), processing branches to step S312. In step S312, since the word as the processing target temporarily stored in the word list does not match any transition from the root node, this word is discarded to empty the word list. Then, processing branches to step S302 to perform processing for the next word.

On the other hand, if it is determined in step S310 that the current state s is not the initial state $s_0$ (NO), processing branches to step S311. In step S311, the automaton 80 resets the state s to the initial state $s_0$, and truncates the length of the word string stored in the word list from the top, with the word to be processed being left. Then, processing is looped to step S304 to search again for a matched transition of this word from among the transitions from the initial state $s_0$.

(7) Computational Efficiency and Memory Usage in Pattern Matching

By applying the above-mentioned conversion processing to the trie storing one or more word string patterns, it is possible to reduce the amount of computation to O (m) when the set of word string patterns having the number n of states of the trie is applied to the input document having the number m of words in the pattern matching. Here, assuming that the average data size of states is k bytes and the average data size of transitions is p bytes, since the number of links is $n^2$ even in the worst case where there are links from every node to every other node, the memory usage M consumed at this time is $(kn+pn^2)$ bytes. For example, if the number n of states is 100, the average data size k of states is 1,000 bytes, and the data size p of transitions is 500 bytes, the memory usage is 5.1 megabytes.

On the other hand, if the set of words is a finite set, it is, in theory, possible to expand the set of words and directly apply the DFA method as disclosed in Shinsuke Mori, "High Speed Morphological Analysis Using DFA," IPSJ SIG Technical Report, 1996-NL-114, Vol. 96, No. 65, pp. 101-107 (July 1996). However, in this case, though the amount of computation becomes O (m), the number of states of the trie increases to nd due to expansion with respect to the average number d of words included in the set of words matched with constraints, so that the memory usage becomes $(knd+p(nd)^2)$ bytes. This means that a very large memory area is necessary for the average size d of the word set matched with the number n of states before conversion of the trie. For example, if the number n of states is 100, the average number d of matched words is 100, the average data size k of states is 1,000 bytes, and the average data size p of transitions is 500 bytes, the memory usage becomes 50 gigabytes.

As another technique, the INTERSECTS and INCLUDED relations that cause ambiguity could be converted into plural regular expressions without ambiguity by means of logical combination. However, in this case, the number of states after conversion becomes $n^3$ with respect to the number n of states of the trie before conversion in the worst case where there are failure functions from every node to every other node and all the relations are INTERSECTS. This is because each node is expanded to a power set of a set of all nodes. The memory usage consumed at this time is $(kn^3+pn^3)$ bytes. For example, if the number n of states is 100, the average data size k of states is 1,000 bytes, and the average data size p of transitions is 500 bytes, the memory usage becomes 1.5 gigabytes. In addition, since this method requires $n^2$ times of matching upon selection of a transition from each node, it is not sufficient from a scalability standpoint as well.

In contrast, in the case of pattern matching using the matching data structure of embodiments of the present invention, the amount of computation is O (m), the memory usage is about $kn+pn^2$ bytes, and the number of times of comparison upon selection of a transition from each node is n×log n times. In other words, it can be said that the pattern matching using the matching data structure of the embodiment is superior to the other techniques in terms of memory usage, computational efficiency, and scalability. In the pattern matching using the matching data structure of embodiments of the present invention, indeterminants are re-evaluated, and this causes a kind of backtrack. However, since it limits the re-evaluation to that for essentially necessary conditions, execution efficiency is not reduced compared to the trie even in the worst case.

(8) Hardware Configuration

FIG. 12 shows a schematic hardware configuration of the computer system 10 of the embodiment. The computer system 10 shown in FIG. 12 includes a central processing unit (CPU) 12, a cache memory 14 having a level, such as L1, L2, or the like, enabling high-speed access of data used by the CPU 12, and a system memory 16 constructed by a solid-state memory device, such as RAM, DRAM, or the like, enabling processing of the CPU 12.

The CPU 12, the cache memory 14, and the system memory 16 are connected through a system bus 18 to other devices or drivers, e.g., to a graphic driver 20 and a network interface card (NIC) 22. The graphic driver 20 is connected to an external display 24 through a bus to display the processing results of the CPU 12 on a display screen. The NIC 22 connects the computer system 10 to a network using a proper communication protocol, such as TCP/IP, at the physical layer level and the data-link layer level.

An I/O bus bridge 26 is also connected to the system bus 18. A hard disk 30 is connected downstream of the I/O bus bridge 26 through an I/O bus 28 such as PCI by means of IDE, ATA, ATAPI, serial ATA, SCSI, or USB. Further, input devices 32 including a keyboard and a pointing device such as a mouse are connected to the I/O bus 28 through a bus such as USB, providing a user interface.

The CPU 12 of the computer system 10 may use any single-core processor or multi-core processor. To be more specific, it may use any CISC or RISC chip, such as Xeon®, Itanium®, POWER5™, POWER6™, or POWER PC®. The computer system 10 is controlled by an operating system (hereinafter referred to as "OS"), such as WINDOWS®200X, UNIX®, or LINUX®, to deploy and execute a program on the system memory 16 under the control of OS in order to control the operation of hardware resources. Thus, the configuration and processing of above-mentioned functional sections can be implemented on the computer.

(9) Experiment (9-1) Implementation on Computer

Using a ThinkPad® X32 computer with a 1.8 GHz PENTIUM® M processor and 2 GB RAM, a computer system for automaton processing according to embodiments of the present invention was implemented. The operation system of this computer system was WINDOWS® XP, Service Pack 2. The program was described in JAVA®.

(9-2) Experimental Result

The average processing times for pattern matching of a sample document by an automaton using the trie structure data 110 alone and an automaton referring to the matching data structure 100 including the additional link structure data 120 of the present invention were measured and evaluated. Note that the sample document was taken from IBM Red Book "IBM Virtualization Engine TS7700: Tape Virtualization for System z Servers." Further, when 19 word string patterns were converted into a trie, the number of states was 37.

FIG. 13 is a graph showing the experimental result using the computer system implemented as described above. In the experiment, pattern matching was performed on the sample document using the computer system, and the average processing time (Average duration (ms)) to complete the pattern matching was plotted on the graph shown in FIG. 13 with respect to the data size (Document size (KB)) of the sample document. In the graph, the black diamond-shaped symbol indicates the result of experimental example using the automaton referring only to the trie, and the black square-shaped symbol indicates the result of experimental example using the automaton referring to the matching data structure (DFA structure) of the present invention.

As shown in FIG. 13, the automaton referring to the matching data structure was shorter in average calculation time than the automaton referring only to the trie at least within the experimental range of document data sizes from 100 KB to 1000 KB. Further, the difference of average calculation times between the automaton referring to the matching data structure and the automaton referring only to the trie became more prominent as the data size increased.

The experimental result in FIG. 13 shows that the automaton referring to the matching data structure of the present invention enables pattern matching with higher computational efficiency than the automaton referring only to the trie.

As described above, according to embodiments of the present invention, there can be provided an information processing apparatus, an information processing method, and a program, capable of realizing matching between word patterns and text information with small memory and high computational efficiency even if the text information includes regular expressions.

The automaton configured to perform pattern matching processing by referring to the data structure converted and defined from the trie in the conversion processing makes a transition between states through an additional transition link efficiently goes across the trie representing one or more constraint patterns, enabling extraction of a part matched with each word pattern in target input information with high computational efficiency. Further, in the additional transition link, a constraint on an indeterminant to be met to deem that it also matches the prefix state string when having matched the tail end of the partial state string K of the transition source is additionally defined. Therefore, even if partial matching between constraint patterns cannot be confirmed like in the case that the constraint patterns include regular expressions, the automaton minimizes re-evaluation of indeterminants so that pattern matching can be performed efficiently. In addition, since the additional transition link is defined while determining the set relation between transition conditions for transition edges, only a minimum number of transition links are defined, thereby making it possible to reduce memory usage.

When the automaton, configured to perform pattern matching by referring to the data structure in which a reference link is defined, reaches a state as the source of the reference link while going across the trie, an output corresponding to the end state of a link destination with only the minimum re-evaluation of indeterminants can be generated. This makes it possible to perform result output of pattern matching with higher computational efficiency.

It will be understood that although each functional section and processing of each functional section according to the present invention has been described for ease of understanding, the present invention may also be configured to assign, to any functional section, the functions for performing the above-mentioned processing, rather than the case where the above-mentioned specific functional section performs specific processing, in consideration of processing efficiency and programming efficiency for implementation.

It should be appreciated that the present invention is applicable to any language other than Japanese, such as English, French, Russian, Korean, Chinese, Arabic, etc.

The above-mentioned functions of the present invention may be implemented by a device-executable program described in an object-oriented programming language, such as C++, Java®, Java® Beans, Java® Applet, Java® Script, Perl, or Ruby. The program may be distributed by storing it on a device-readable recording medium.

While the present invention has been described in connection with the embodiment, the present invention is not limited to the embodiment, which those skilled in the art may change by addition, alternation, and/or deletion to make other embodiments. Such embodiments are also included in the scope of the present invention as long as they have the advantages of the present invention.

The invention claimed is:

1. An information processing apparatus for defining a data structure for pattern matching comprising:
   a generation section configured to generate an ordered tree structure by defining transition edges between nodes using, as transition conditions, respective constraints from one or more constraint patterns each including plural constraints;
   a search section configured to search for a second substructure of the ordered tree structure similar to a first substructure of the ordered tree structure from a root node by determining a set relation between transition conditions of respective transition edges;
   a transition defining section configured to define an additional transition link from a tail node of the second substructure to a child node at a tail end of the first substructure, the additional transition link adding a constraint to be met by an indeterminant identified from the set relation; and
   a storage device configured to store the ordered tree structure and additional transition link as the defined data structure for pattern matching.

2. The information processing apparatus according to claim 1, further comprising a reference defining section configured to define a reference link from the tail node of the second substructure to a tail node of the first substructure the tail end of which is an end state, the reference link being subject to the constraint to be met by the indeterminant identified from the set relation.

3. The information processing apparatus according to claim 1, wherein the search section identifies, as similar substructure, a node string connected by a transition edge whose transition condition is in an EQUALS, INCLUDED, INCLUDES, or INTERSECTS relation.

4. The information processing apparatus according to claim 1, wherein when a transition condition from a tail node of the first substructure is in neither INCLUDED nor EQUALS relation with a transition condition from the tail node of the second substructure, the transition defining section defines the additional transition link.

5. The information processing apparatus according to claim 1, wherein when a transition condition from a node of the first substructure is in an INCLUDED or INTERSECTS relation with a corresponding transition edge at the second substructure, the search section records the corresponding transition edge as the indeterminant and a constraint of the transition condition as the constraint to be met by the indeterminant identified from the set relation.

6. The information processing apparatus according to claim 1, further comprising:
   an automaton configured to match input information with the one or more constraint patterns represented by the defined data structure.

7. The information processing apparatus according to claim 1, wherein each of the constraints comprising a constraint pattern includes one or more constraint elements for a character string expression, regular expression, or part-of-speech information of a word.

8. A computer program product for defining a data structure for pattern matching, the computer program product comprising at least one non-transitory computer-readable storage medium having computer-usable program code stored therein, the computer-usable program code comprising:
   computer-usable program code for generating an ordered tree structure by defining transition edges between nodes using, as transition conditions, respective constraints from one or more constraint patterns each including plural constraints;
   computer-usable program code for searching for a second substructure of the ordered tree structure similar to a first substructure of the ordered tree structure from a root node by determining a set relation between transition conditions of respective transition edges; and
   computer-usable program code for defining an additional transition link from a tail node of the second substructure to a child node at a tail end of the first substructure, the additional transition link adding a constraint to be met by an indeterminant identified from the set relation.

9. The computer program product according to claim 8, further comprising:
   computer-usable program code for defining a reference link from the tail node of the second substructure to a tail node of the first substructure the tail end of which is an end state, the reference link being subject to the constraint to be met by the indeterminant identified from the set relation.

10. The computer program product according to claim 8, wherein the computer-usable program code for searching for a second substructure similar to a first substructure comprises computer-usable program code for searching for a node string connected by a transition edge whose transition condition is in an EQUALS, INCLUDED, INCLUDES, or INTERSECTS relation.

11. The computer program product according to claim 8, wherein when a transition condition from a tail node of the first substructure is in neither INCLUDED nor EQUALS relation with a transition condition from the tail node of the second substructure, the additional transition link is defined.

12. The computer program product according to claim 8, further comprising:
   computer-usable program code for, when a transition condition from a node of the first substructure is in an INCLUDED or INTERSECTS relation with a corresponding transition edge at the second substructure, recording the corresponding transition edge as the indeterminant and a constraint of the transition condition as the constraint to be met by the indeterminant identified from the set relation.

13. The computer program product according to claim 8, further comprising:
   computer-usable program code for providing an automaton configured to match input information with the one or more constraint patterns represented by the defined data structure.

14. The computer program product according to claim 8, wherein each of the constraints comprising a constraint pattern includes one or more constraint elements for a character string expression, regular expression, or part-of-speech information of a word.

15. The computer program product according to claim 8, further comprising:
   computer-usable program code for storing the defined data structure for pattern matching in a storage device.

* * * * *